US007120601B2

(12) United States Patent
Chen et al.

(10) Patent No.: US 7,120,601 B2
(45) Date of Patent: Oct. 10, 2006

(54) OPTIMAL ASSET ALLOCATION DURING RETIREMENT IN THE PRESENCE OF FIXED AND VARIABLE IMMEDIATE LIFE ANNUITIES (PAYOUT ANNUITIES)

(75) Inventors: Peng Chen, Elmhurst, IL (US); Moshe A. Milevsky, Toronto (CA)

(73) Assignee: Ibbotson Associates, Inc., Chicago, IL (US)

( * ) Notice: Subject to any disclaimer, the term of this patent is extended or adjusted under 35 U.S.C. 154(b) by 1050 days.

(21) Appl. No.: 10/173,743

(22) Filed: Jun. 18, 2002

(65) Prior Publication Data

US 2003/0233301 A1    Dec. 18, 2003

(51) Int. Cl.
G06F 17/60 (2006.01)
(52) U.S. Cl. .......................................... 705/36; 705/4
(58) Field of Classification Search .................... 705/4, 705/36, 35
See application file for complete search history.

(56) References Cited

U.S. PATENT DOCUMENTS

| 5,148,365 | A | 9/1992 | Dembo ........................ 364/402 |
| 5,774,881 | A | 6/1998 | Friend et al. ................... 705/36 |
| 5,806,047 | A | 9/1998 | Hackel et al. .................. 705/36 |
| 5,812,987 | A | 9/1998 | Luskin et al. ................... 705/36 |
| 5,819,238 | A | 10/1998 | Fernholz ........................ 705/36 |
| 5,884,287 | A | 3/1999 | Edesess ......................... 705/36 |
| 5,911,135 | A | 6/1999 | Atkins .......................... 705/36 |
| 5,911,136 | A | 6/1999 | Atkins .......................... 705/36 |
| 5,918,217 | A | 6/1999 | Maggioncalda et al. ...... 705/36 |
| 5,933,815 | A | 8/1999 | Golden ......................... 705/35 |
| 5,999,917 | A | 12/1999 | Facciani et al. ............... 705/36 |
| 6,003,018 | A | 12/1999 | Michaud et al. ............... 705/36 |
| 6,012,043 | A | 1/2000 | Albright et al. ............... 705/36 |
| 6,012,044 | A | 1/2000 | Maggioncalda et al. ...... 705/36 |
| 6,018,722 | A | 1/2000 | Ray et al. ...................... 705/36 |
| 6,021,397 | A | 2/2000 | Jones et al. .................... 705/36 |
| 6,055,517 | A | 4/2000 | Friend et al. .................. 705/36 |
| 6,078,904 | A | 6/2000 | Rebane .......................... 705/36 |
| 6,154,732 | A | 11/2000 | Tarbox .......................... 705/36 |
| 6,205,434 | B1 | 3/2001 | Ryan et al. .................... 705/35 |

(Continued)

FOREIGN PATENT DOCUMENTS

JP    2001-076057    3/2001

(Continued)

OTHER PUBLICATIONS

Scott F. Richard, Carnegie-Mellon University "Optimal Consumption, Portfolio and Life Insurance Rules for an Uncertain Lived Individual in a Continuous Time Model", Journal of Financial Economics 2(1975) 187-203, North Holland Publing Company.*

(Continued)

*Primary Examiner*—Frantzy Poinvil
*Assistant Examiner*—Harish T. Dass
(74) *Attorney, Agent, or Firm*—DLA Piper Rudnick Gray Cary US LLP; R. Blake Johnston

(57) ABSTRACT

A method, system and medium for optimally allocating investment assets for a given investor within and between annuitized assets and non-annuitized assets retrieves an investor's utility of consumption, utility of bequest, objective and subjective probabilities of survival and expected rates of return from each of a plurality of annuity and nonannuity assets having varying degrees of risk and return. Based on these inputs, an objective utility function is maximized by adjusting the asset allocation weights. The optimal asset allocation weights may be used to allocate the assets of the investor's portfolio among predetermined investment vehicles or as an analytical tool by portfolio managers.

95 Claims, 18 Drawing Sheets

U.S. PATENT DOCUMENTS

| | | | |
|---|---|---|---|
| 6,219,650 B1 | 4/2001 | Friend et al. | 705/36 |
| 6,240,399 B1 | 5/2001 | Frank et al. | 705/36 |
| 6,253,192 B1 | 6/2001 | Corlett et al. | 705/36 |
| 6,275,814 B1 | 8/2001 | Giansante et al. | 705/36 |
| 6,282,520 B1 | 8/2001 | Schirripa | 705/36 |
| 6,292,787 B1 | 9/2001 | Scott et al. | 705/36 |
| 6,336,103 B1 | 1/2002 | Baker | 705/36 |
| 6,360,210 B1 | 3/2002 | Wallman | 705/36 |
| 6,405,179 B1 | 6/2002 | Rebane | 705/36 |
| 6,430,542 B1 | 8/2002 | Moran | 705/36 |
| 6,484,151 B1 | 11/2002 | O'Shaughnessy | 705/36 |
| 6,484,152 B1 | 11/2002 | Robinson | 705/36 |
| 6,601,044 B1 | 7/2003 | Wallman | 705/36 |
| 6,609,110 B1 | 8/2003 | Dowd et al. | 705/36 |
| 2002/0002521 A1 | 1/2002 | Shearer et al. | 705/36 |
| 2002/0013751 A1 | 1/2002 | Facciani et al. | 705/36 |
| 2002/0013754 A1* | 1/2002 | Frank et al. | 705/36 |
| 2002/0038271 A1 | 3/2002 | Friend et al. | 705/36 |
| 2002/0046145 A1 | 4/2002 | Ittai | 705/36 |
| 2002/0059127 A1 | 5/2002 | Brown et al. | 705/36 |
| 2002/0062272 A1 | 5/2002 | Kim et al. | 705/36 |
| 2002/0091605 A1 | 7/2002 | Labe, Jr. et al. | 705/36 |
| 2002/0103733 A1 | 8/2002 | Barrington et al. | 705/35 |
| 2002/0107770 A1 | 8/2002 | Meyer et al. | 705/36 |
| 2002/0123951 A1 | 9/2002 | Olsen et al. | 705/36 |
| 2002/0123953 A1 | 9/2002 | Goldfarb et al. | 705/36 |
| 2002/0128941 A1 | 9/2002 | Champion et al. | 705/36 |
| 2002/0138381 A1 | 9/2002 | Tomecek | 705/36 |
| 2002/0138383 A1 | 9/2002 | Rhee | 705/36 |
| 2002/0138386 A1 | 9/2002 | Maggioncalda et al. | 705/36 |
| 2002/0138388 A1 | 9/2002 | Reiss | 705/36 |
| 2002/0138389 A1 | 9/2002 | Martone et al. | 705/36 |
| 2002/0152151 A1 | 10/2002 | Baughman et al. | 705/36 |
| 2002/0156710 A1 | 10/2002 | Ryder | 705/35 |
| 2002/0169701 A1 | 11/2002 | Tarbox et al. | 705/36 |
| 2002/0174042 A1 | 11/2002 | Arena et al. | 705/35 |
| 2002/0174045 A1 | 11/2002 | Arena et al. | 705/36 |
| 2002/0174046 A1 | 11/2002 | Mistretta | 705/36 |
| 2002/0174047 A1 | 11/2002 | Fernholz | 705/36 |
| 2002/0184129 A1 | 12/2002 | Arena | 705/35 |
| 2003/0004849 A1 | 1/2003 | Velez et al. | 705/36 |
| 2003/0009409 A1 | 1/2003 | Horner et al. | 705/36 |
| 2003/0014343 A1 | 1/2003 | Jones | 705/36 |
| 2003/0028463 A1 | 2/2003 | Long, III et al. | 705/36 |
| 2003/0028466 A1 | 2/2003 | Jenson et al. | 705/36 |
| 2003/0065602 A1 | 4/2003 | Yip | 705/36 |
| 2003/0078867 A1 | 4/2003 | Scott et al. | 705/36 |
| 2003/0083972 A1 | 5/2003 | Williams | 705/36 |
| 2003/0088489 A1 | 5/2003 | Peters et al. | 705/36 |
| 2003/0088492 A1 | 5/2003 | Damschroder | 705/36 |
| 2003/0093347 A1 | 5/2003 | Gray | 705/35 |
| 2003/0097324 A1 | 5/2003 | Speckman | 705/36 |
| 2003/0110113 A1 | 6/2003 | Martin | 705/36 |
| 2003/0120574 A1 | 6/2003 | Wallman | 705/36 |
| 2003/0120575 A1 | 6/2003 | Wallman | 705/36 |
| 2003/0120576 A1 | 6/2003 | Duckworth | 705/36 |
| 2003/0126054 A1 | 7/2003 | Purcell, Jr. | 705/36 |
| 2003/0144936 A1 | 7/2003 | Sloan et al. | 705/36 |
| 2003/0172018 A1 | 9/2003 | Chen et al. | 705/36 |
| 2003/0195829 A1 | 10/2003 | Oberuc | 705/36 |
| 2003/0208427 A1 | 11/2003 | Peters et al. | 705/36 |
| 2003/0208429 A1 | 11/2003 | Bennett | 705/36 |
| 2003/0212622 A1 | 11/2003 | Wallman | 705/36 |
| 2003/0225663 A1 | 12/2003 | Horan et al. | 705/36 |
| 2004/0002892 A1 | 1/2004 | Gluck et al. | 705/10 |

FOREIGN PATENT DOCUMENTS

WO      WO 01/93153 A1 * 12/2001

OTHER PUBLICATIONS

Harry Markowitz, "Portfolio Selection," *Journal of Finance*, Mar. 1952, pp. 77-91.

William F. Sharpe, "Capital Asset Prices: A Theory of Market Equilibrium Under Conditions of Risk" *Journal of Finance*, Sep. 1964, vol. 19, pp. 425-442.

Robert C. Merton, "Optimum Consumption amd Portfolio Rules in a Continuous-Time Model," *Journal of Economic Theory*, (1971) vol. 3, pp. 373-413.

"Optimal Consumption, Portfolio and Life Insurance Rules for an Uncertain Lived Individual in a Continuous Time Model," Journal of Financial Economics, (1975) vol. 2, pp. 187-203.

M. Yaari, "Uncertain Lifetime, Life Insurance and the Theory of the Consumer," *Review of Economic Studies*, vol. 32, pp. 137-150, (1965).

Brugiavini, "Uncertainty Resolution and the Timing of Annuity Purchases," *Journal of Public Economics*, vol. 50, pp. 31-62, (1993).

Blake, Cairns and Dowd (2000) "PensionMetrics: Stochastic Pension Plan Design during the Distribution Phase," Pensions Institute Working Paper.

S. Kapur and J.M. Orszag, "A Portfolio Approach to Investment and Annuitization During Retirement," Birbeck College (University of London) Mimeo, May 1999.

William H. Press, Brian P. Flannery, Saul A. Teukolsky, and William T. Vetterling, "Numerical Recipes in C: the Art of Scientific Computing," Cambridge University Press, 1988.

Web page: Efficient Solutions, Inc., http://www.effisols.com, believed posted at least as early as Mar. 2, 2001, copyr. 1998-2002.

Delaney and Reichenstein, "An Expanded Portfolio View Includes Real Estate and Human Capital", AAII Journal (Jul. 1996), pp. 7-11.

Hanna and Chen, "Subjective and Objective Risk Tolerance: Implications For Optimal Portfolios", Financial Counseling and Investing, vol. 8(2), pp. 17-26 (1997).

Web page: ITS Associates, Inc.—Products, http://www.itsww.com/products, last updated Feb. 26, 2002, copyr. 1999.

Web page: ITS Associates, Inc., —Query2Trader, http://www.itsww.com/products/trader.htm, last updated Apr. 3, 2000, copyr. 1999.

Web page: Horace Mann Educators Corporation, "Rebalancing keeps your portfolio in sync", http://www.horacemann.com/html/annuity/rebalance.html, copyr. 2002.

Web page: Advisor Software, Inc., "Advisor Software: Solutions—Portfolio Rebalancing Solution", http://www.advisorsoftware.com/solutions/portfolio_rebalancing.html, copyr. 2003.

Web page: Advisor Software, Inc., "Advisor Software: Solutions—Advice Modules", http://www.advisorsoftware.com/solutions/risk_assessment.html, copyr. 2004.

Web page: Advisor Software, Inc., "Advisor Software: Solutions—Advice Modules", http://www.advisorsoftware.com/solutions/asset_allocation.html, copyr. 2004.

Web page: Strategic Financial Solutions, LLC., "PerTrac 2000 Softawre: Asset Allocation", http://www.pertrac2000.com/allocation.asp, copyr. 2002.

Web page: Strategic Financial Solutions, LLC, "PerTrac 2000: Portfolio Optimization", http://www.pertrac2000.com/optimization.asp, copyr. 2001.

Web page: Portfolio Survival Simulator, http://www.portfoliosurvival.com/allocations.htm.

Professor Laurence Booth, "Asset Allocation and the Retirement Problem" (Apr. 4, 2003).

John Norstad, "Asset Allocation and Portfolio Survival" (Feb. 15, 1999; updated Oct. 31, 2003).

* cited by examiner

FIG. 1a

*This table is for relatively healthy people, and is used for pricing immediate annui
People's subjective probability of survival (p.par) is probably lower.*

Society of Actuaries
IAM 2000 Table

| Age | Female | Male |
|---|---|---|
| 0 | 0.001615 | 0.002080 |
| 1 | 0.000680 | 0.000815 |
| 2 | 0.000353 | 0.000454 |
| 3 | 0.000261 | 0.000367 |
| 4 | 0.000209 | 0.000321 |
| 5 | 0.000171 | 0.000291 |
| 6 | 0.000141 | 0.000270 |
| 7 | 0.000118 | 0.000257 |
| 8 | 0.000118 | 0.000294 |
| 9 | 0.000121 | 0.000325 |
| 10 | 0.000126 | 0.000350 |
| 11 | 0.000133 | 0.000371 |
| 12 | 0.000142 | 0.000388 |
| 13 | 0.000152 | 0.000402 |
| 14 | 0.000164 | 0.000414 |
| 15 | 0.000177 | 0.000425 |
| 16 | 0.000190 | 0.000437 |
| 17 | 0.000204 | 0.000449 |
| 18 | 0.000219 | 0.000463 |
| 19 | 0.000234 | 0.000480 |
| 20 | 0.000250 | 0.000499 |
| 21 | 0.000265 | 0.000519 |
| 22 | 0.000281 | 0.000542 |
| 23 | 0.000298 | 0.000566 |
| 24 | 0.000314 | 0.000592 |
| 25 | 0.000331 | 0.000616 |
| 26 | 0.000347 | 0.000639 |
| 27 | 0.000362 | 0.000659 |
| 28 | 0.000376 | 0.000675 |
| 29 | 0.000389 | 0.000687 |
| 30 | 0.000402 | 0.000694 |
| 31 | 0.000414 | 0.000699 |
| 32 | 0.000425 | 0.000700 |
| 33 | 0.000436 | 0.000701 |
| 34 | 0.000449 | 0.000702 |
| 35 | 0.000463 | 0.000704 |
| 36 | 0.000481 | 0.000719 |
| 37 | 0.000504 | 0.000749 |
| 38 | 0.000532 | 0.000796 |
| 39 | 0.000567 | 0.000864 |
| 40 | 0.000609 | 0.000953 |
| 41 | 0.000658 | 0.001065 |
| 42 | 0.000715 | 0.001201 |
| 43 | 0.000781 | 0.001362 |

| 80 | Survive to: |
|---|---|
| 81 | 0.94936 |
| 82 | 0.89652 |
| 83 | 0.84176 |
| 84 | 0.78541 |
| 85 | 0.72786 |
| 86 | 0.66958 |
| 87 | 0.61107 |
| 88 | 0.55292 |
| 89 | 0.49572 |
| 90 | 0.44009 |
| 91 | 0.38667 |
| 92 | 0.33601 |
| 93 | 0.28862 |
| 94 | 0.24492 |
| 95 | 0.20520 |
| 96 | 0.16964 |
| 97 | 0.13831 |
| 98 | 0.11107 |
| 99 | 0.08769 |
| 100 | 0.06789 |
| 101 | 0.05136 |
| 102 | 0.03782 |
| 103 | 0.02695 |
| 104 | 0.01847 |
| 105 | 0.01208 |
| 106 | 0.00746 |
| 107 | 0.00430 |
| 108 | 0.00227 |
| 109 | 0.00108 |
| 110 | 0.00045 |
| 111 | 0.00016 |
| 112 | 0.00004 |
| 113 | 0.00001 |
| 114 | 0.00000 |
| 115 | 0.00000 |
| 116 | 0.00000 |
| 117 | 0.00000 |
| 118 | 0.00000 |
| 119 | 0.00000 |
| 120 | 0.00000 |
| 121 | 0.00000 |
| 122 | 0.00000 |
| 123 | 0.00000 |
| 124 | 0.00000 |

Fig 1b

| | | | | | |
|---|---|---|---|---|---|
| 44 | 0.000855 | 0.001547 | | 125 | 0.00000 |
| 45 | 0.000939 | 0.001752 | | 126 | 0.00000 |
| 46 | 0.001035 | 0.001974 | | 127 | 0.00000 |
| 47 | 0.001141 | 0.002211 | | 128 | 0.00000 |
| 48 | 0.001261 | 0.002460 | | 129 | 0.00000 |
| 49 | 0.001393 | 0.002721 | | 130 | 0.00000 |
| 50 | 0.001538 | 0.002994 | | 131 | 0.00000 |
| 51 | 0.001695 | 0.003279 | | 132 | 0.00000 |
| 52 | 0.001864 | 0.003576 | | 133 | 0.00000 |
| 53 | 0.002047 | 0.003884 | | 134 | 0.00000 |
| 54 | 0.002244 | 0.004203 | | 135 | 0.00000 |
| 55 | 0.002457 | 0.004534 | | 136 | 0.00000 |
| 56 | 0.002689 | 0.004876 | | 137 | 0.00000 |
| 57 | 0.002942 | 0.005228 | | 138 | 0.00000 |
| 58 | 0.003218 | 0.005593 | | 139 | 0.00000 |
| 59 | 0.003523 | 0.005988 | | 140 | 0.00000 |
| 60 | 0.003863 | 0.006428 | | 141 | 0.00000 |
| 61 | 0.004242 | 0.006933 | | 142 | 0.00000 |
| 62 | 0.004668 | 0.007520 | | 143 | 0.00000 |
| 63 | 0.005144 | 0.008207 | | 144 | 0.00000 |
| 64 | 0.005671 | 0.009008 | | 145 | 0.00000 |
| 65 | 0.006250 | 0.009940 | | 146 | 0.00000 |
| 66 | 0.006878 | 0.011016 | | 147 | 0.00000 |
| 67 | 0.007555 | 0.012251 | | 148 | 0.00000 |
| 68 | 0.008287 | 0.013657 | | 149 | 0.00000 |
| 69 | 0.009102 | 0.015233 | | 150 | 0.00000 |
| 70 | 0.010034 | 0.016979 | | 151 | 0.00000 |
| 71 | 0.011117 | 0.018891 | | 152 | 0.00000 |
| 72 | 0.012386 | 0.020967 | | 153 | 0.00000 |
| 73 | 0.013871 | 0.023209 | | 154 | 0.00000 |
| 74 | 0.015592 | 0.025644 | | 155 | 0.00000 |
| 75 | 0.017564 | 0.028304 | | 156 | 0.00000 |
| 76 | 0.019805 | 0.031220 | | 157 | 0.00000 |
| 77 | 0.022328 | 0.034425 | | 158 | 0.00000 |
| 78 | 0.025158 | 0.037948 | | 159 | 0.00000 |
| 79 | 0.028341 | 0.041812 | | 160 | 0.00000 |
| 80 | 0.031933 | 0.046037 | | 161 | 0.00000 |
| 81 | 0.035985 | 0.050643 | | 162 | 0.00000 |
| 82 | 0.040552 | 0.055651 | | 163 | 0.00000 |
| 83 | 0.045690 | 0.061080 | | 164 | 0.00000 |
| 84 | 0.051456 | 0.066948 | | 165 | 0.00000 |
| 85 | 0.057913 | 0.073275 | | 166 | 0.00000 |
| 86 | 0.065119 | 0.080076 | | 167 | 0.00000 |
| 87 | 0.073136 | 0.087370 | | 168 | 0.00000 |
| 88 | 0.081991 | 0.095169 | | 169 | 0.00000 |
| 89 | 0.091577 | 0.103455 | | 170 | 0.00000 |
| 90 | 0.101758 | 0.112208 | | 171 | 0.00000 |
| 91 | 0.112395 | 0.121402 | | 172 | 0.00000 |
| 92 | 0.123349 | 0.131017 | | 173 | 0.00000 |
| 93 | 0.134486 | 0.141030 | | 174 | 0.00000 |
| 94 | 0.145689 | 0.151422 | | 175 | 0.00000 |
| 95 | 0.156846 | 0.162179 | | 176 | 0.00000 |

FIG 1c

| 96  | 0.167841 | 0.173279 |
|-----|----------|----------|
| 97  | 0.178563 | 0.184706 |
| 98  | 0.189604 | 0.196946 |
| 99  | 0.201557 | 0.210484 |
| 100 | 0.215013 | 0.225806 |
| 101 | 0.230565 | 0.243398 |
| 102 | 0.248805 | 0.263745 |
| 103 | 0.270326 | 0.287334 |
| 104 | 0.295719 | 0.314649 |
| 105 | 0.325576 | 0.346177 |
| 106 | 0.360491 | 0.382403 |
| 107 | 0.401054 | 0.423813 |
| 108 | 0.447860 | 0.470893 |
| 109 | 0.501498 | 0.524128 |
| 110 | 0.562563 | 0.584004 |
| 111 | 0.631645 | 0.651007 |
| 112 | 0.709338 | 0.725622 |
| 113 | 0.796233 | 0.808336 |
| 114 | 0.892923 | 0.899633 |
| 115 | 1.000000 | 1.000000 |

| 177 | 0.00000 |
|-----|---------|
| 178 | 0.00000 |
| 179 | 0.00000 |
| 180 | 0.00000 |
| 181 | 0.00000 |
| 182 | 0.00000 |
| 183 | 0.00000 |
| 184 | 0.00000 |
| 185 | 0.00000 |
| 186 | 0.00000 |
| 187 | 0.00000 |
| 188 | 0.00000 |
| 189 | 0.00000 |
| 190 | 0.00000 |
| 191 | 0.00000 |
| 192 | 0.00000 |
| 193 | 0.00000 |
| 194 | 0.00000 |
| 195 | 0.00000 |
| 196 | 0.00000 |

FIG. 2A: Optimal Allocations:
Male age 60, 100% bequest, 20 year horizon, Rf=5%, R=10%, SD=20%
| Risk Aversion | Money | Equity | FIA | VIA | Total Risk Free | Total Risky | Total Traditional | Total Annuity |
|---|---|---|---|---|---|---|---|---|
| 1 | 2% | 98% | 0% | 0% | 2% | 98% | 100% | 0% |
| 1.5 | 16% | 84% | 0% | 0% | 16% | 84% | 100% | 0% |
| 2 | 36% | 64% | 0% | 0% | 36% | 64% | 100% | 0% |
| 2.5 | 50% | 50% | 0% | 0% | 50% | 50% | 100% | 0% |
| 3 | 56% | 44% | 0% | 0% | 56% | 44% | 100% | 0% |
| 3.5 | 62% | 38% | 0% | 0% | 62% | 38% | 100% | 0% |
| 4 | 68% | 32% | 0% | 0% | 68% | 32% | 100% | 0% |
| 4.5 | 72% | 28% | 0% | 0% | 72% | 28% | 100% | 0% |
| 5 | 74% | 26% | 0% | 0% | 74% | 26% | 100% | 0% |
| 5.5 | 78% | 22% | 0% | 0% | 78% | 22% | 100% | 0% |
| 6 | 80% | 20% | 0% | 0% | 80% | 20% | 100% | 0% |
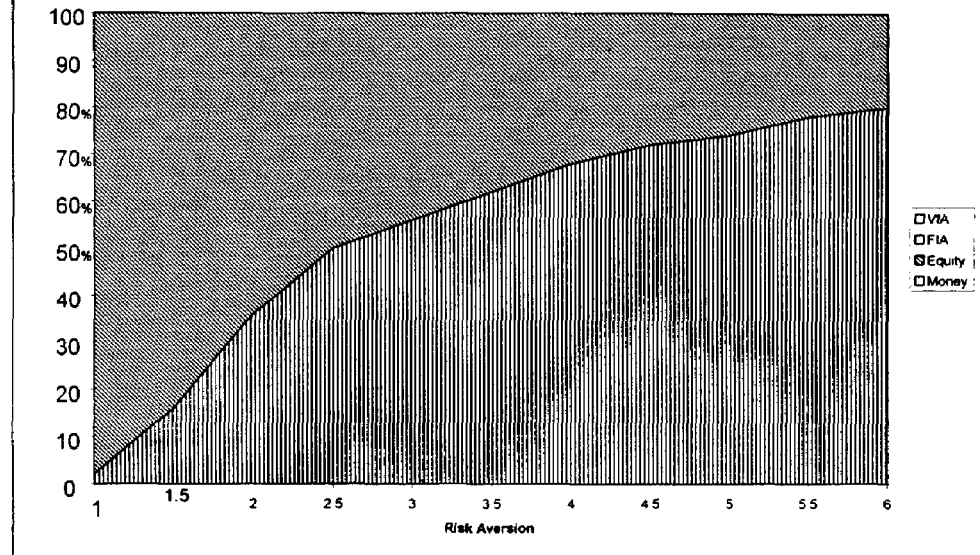
FIG. 2B: Optimal Allocations
Male, age 60, 65% survival, 100% bequest, Rf=5%, R=10%, SD=20%

FIG. 3A: Optimal Allocations:
Male age 60, 0% bequest, 20 year horizon, Rf=5%, R=10%, SD=20%
| Risk Aversion | Money | Equity | FIA | VIA | Total Risk Free | Total Risky | Total Traditional | Total Annuity |
|---|---|---|---|---|---|---|---|---|
| 1 | 0% | 0% | 2% | 98% | 2% | 98% | 0% | 100% |
| 1.5 | 0% | 0% | 16% | 84% | 16% | 84% | 0% | 100% |
| 2 | 0% | 0% | 36% | 64% | 36% | 64% | 0% | 100% |
| 2.5 | 0% | 0% | 50% | 50% | 50% | 50% | 0% | 100% |
| 3 | 0% | 0% | 58% | 42% | 58% | 42% | 0% | 100% |
| 3.5 | 0% | 0% | 64% | 36% | 64% | 36% | 0% | 100% |
| 4 | 0% | 0% | 68% | 32% | 68% | 32% | 0% | 100% |
| 4.5 | 0% | 0% | 70% | 30% | 70% | 30% | 0% | 100% |
| 5 | 0% | 0% | 76% | 24% | 76% | 24% | 0% | 100% |
| 5.5 | 0% | 0% | 78% | 22% | 78% | 22% | 0% | 100% |
| 6 | 0% | 0% | 80% | 20% | 80% | 20% | 0% | 100% |
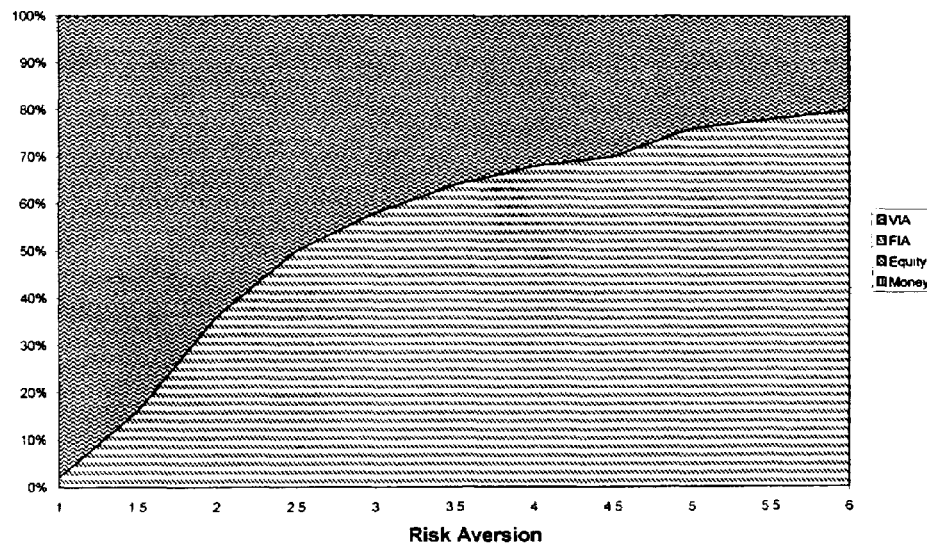
FIG. 3B: Optimal Allocations
Male, age 60, 65% survival, 0% bequest, Rf=5%, R=10%, SD=20%

FIG. 4A: Optimal Allocations:
Male age 60, 20% bequest, 20 year horizon, Rf=5%, R=10%, SD=20%
| Risk Aversion | Money | Equity | FIA | VIA | Total Risk Free | Total Risky | Total Traditional | Total Annuity |
|---|---|---|---|---|---|---|---|---|
| 1 | 4% | 30% | 0% | 66% | 4% | 96% | 34% | 66% |
| 1.5 | 8% | 42% | 8% | 42% | 16% | 84% | 50% | 50% |
| 2 | 22% | 38% | 14% | 26% | 36% | 64% | 60% | 40% |
| 2.5 | 34% | 34% | 16% | 16% | 50% | 50% | 68% | 32% |
| 3 | 42% | 30% | 16% | 12% | 58% | 42% | 72% | 28% |
| 3.5 | 48% | 28% | 16% | 8% | 64% | 36% | 76% | 24% |
| 4 | 54% | 24% | 14% | 8% | 68% | 32% | 78% | 22% |
| 4.5 | 60% | 22% | 12% | 6% | 72% | 28% | 82% | 18% |
| 5 | 60% | 22% | 14% | 4% | 74% | 26% | 82% | 18% |
| 5.5 | 66% | 18% | 12% | 4% | 78% | 22% | 84% | 16% |
| 6 | 68% | 18% | 12% | 2% | 80% | 20% | 86% | 14% |
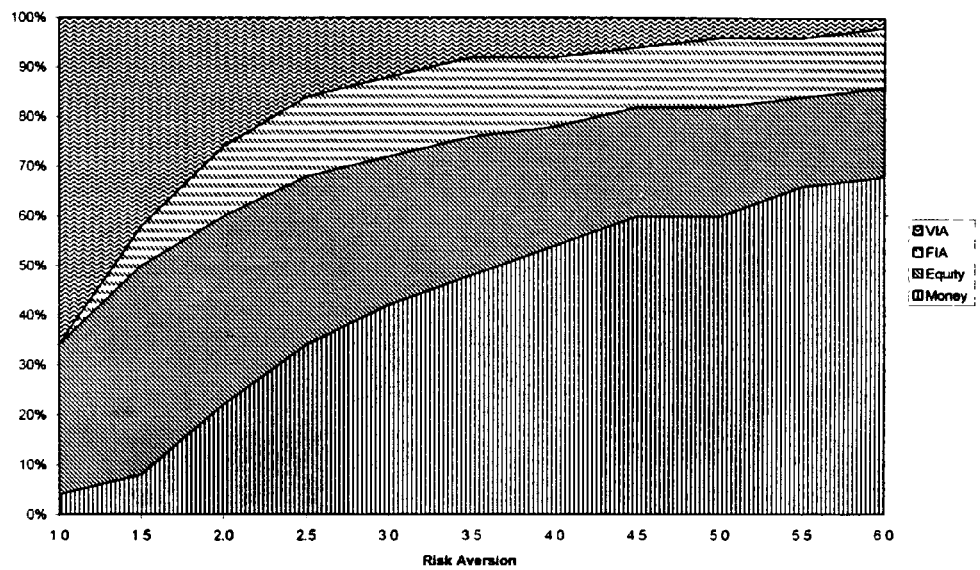
FIG. 4B: Optimal Allocations
Male, age 60, 65% survival, 20% bequest, Rf=5%, R=10%, SD=20%

FIG. 5A: Optimal Allocations:

Male age 60, 20% bequest, 20 year horizon, Rf=5%, R=10%, SD=20%, Pbar=50%

| Risk Aversion | Money | Equity | FIA | VIA | Total Risk Free | Total Risky | Total Traditional | Total Annuity |
|---|---|---|---|---|---|---|---|---|
| 1 | 2% | 56% | 0% | 42% | 2% | 98% | 58% | 42% |
| 1.5 | 10% | 60% | 4% | 26% | 14% | 86% | 70% | 30% |
| 2 | 28% | 48% | 8% | 16% | 36% | 64% | 76% | 24% |
| 2.5 | 42% | 40% | 8% | 10% | 50% | 50% | 82% | 18% |
| 3 | 48% | 36% | 10% | 6% | 58% | 42% | 84% | 16% |
| 3.5 | 56% | 30% | 8% | 6% | 64% | 36% | 86% | 14% |
| 4 | 62% | 26% | 8% | 4% | 70% | 30% | 88% | 12% |
| 4.5 | 64% | 26% | 8% | 2% | 72% | 28% | 90% | 10% |
| 5 | 66% | 24% | 8% | 2% | 74% | 26% | 90% | 10% |
| 5.5 | 72% | 20% | 6% | 2% | 78% | 22% | 92% | 8% |
| 6 | 74% | 18% | 6% | 2% | 80% | 20% | 92% | 8% |

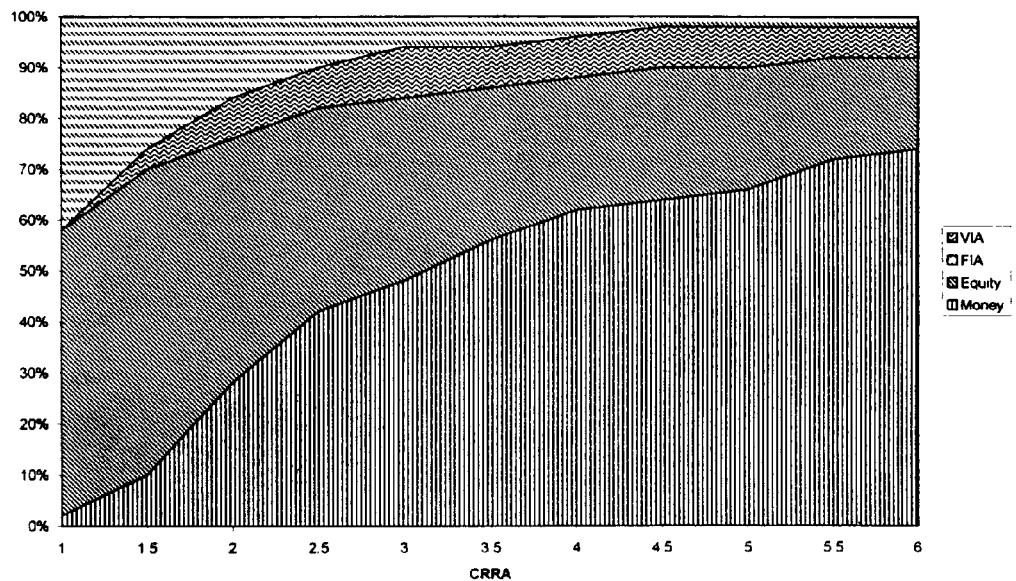

FIG. 5B: Optimal Allocations

Male, age 60, 65% survival, 20% bequest, Rf=5%, R=10%, SD=20%, Subjective Survival

OPTIMAL ASSET ALLOCATION DURING RETIREMENT IN THE PRESENCE OF FIXED AND VARIABLE IMMEDIATE LIFE ANNUITIES (PAYOUT ANNUITIES)

FIELD OF THE INVENTION

The present invention relates to a method and system for allocating retirement savings to finance retirement consumption. More particularly, the present invention relates to a method and system for optimally allocating investment assets within and between annuitized assets and non-annuitized assets having different degrees of risk and return.

BACKGROUND OF THE INVENTION

With the large bulk of baby boomers getting closer to their golden years, a great deal of public interest is shifting toward how individuals should finance their retirement. Although a substantial portion of retirement needs is usually provided by company and government pensions, there is often a large gap that can only be funded with discretionary savings. Indeed, based on the Survey of Consumer Finances, the number one reason for households to save is to finance retirement.

One of the most important decisions investors have to make is how to allocate their retirement savings to finance their retirement consumption. Investors face two major risk factors when making asset allocation decisions in retirement: financial market risk and longevity risk. Financial market risk is the performance uncertainty of investment vehicles. It is typically measured and quantified by the volatility of the investment returns. Longevity risk, on the other hand, is the uncertainty of how long the consumer will need retirement income (i.e., the risk that the consumer could potentially outlive his or her investments). Financial market risk is related to financial market behavior and economic the environment; longevity risk is normally related to the health condition of the investor.

Traditionally, asset allocation is determined by constructing efficient portfolios for various risk levels based on modern portfolio theory (MPT) developed by Harry Markowitz (1952) "Portfolio Selection," *Journal of Finance*, September 1952, pp.77–91; and later by Sharpe (1965) "Capital Asset Prices: A Theory of Market Equilibrium," *Journal of Finance*, September 1964. According to the investor's risk tolerance, one of the efficient portfolios is chosen. MPT is widely accepted in the academic and the finance industry as the primary tool for developing asset allocations. However, two important factors not considered in MPT make its effectiveness questionable when dealing with asset allocations for individual investors in retirement. First, longevity risk is not considered. Second, portfolios in retirement often face periodical withdrawals to finance retirement consumption. Being a one-period model, MPT does not take periodic withdrawals into consideration.

In "Optimum Consumption and Portfolio Rules in a Continuous-Time Model", *Journal of Economic Theory*, (1971) Vol. 3, pp. 373–413, and in "Optimal Consumption, Portfolio and Life Insurance Rules for an Uncertain Lived Individual in a Continuous Time Model", *The Journal of Financial Economics*, (1975) Vol. 2, pp. 187–203, a multi-period extension of MPT which incorporates insurance is disclosed. However, even this extension of MPT fails to account for the specifics of a desired retirement standard of living and the irreversibility of immediate annuities.

Annuitization involves paying a non-refundable lump sum to an insurance company. In exchange, the insurance company guarantees a constant life-long payment stream that can not be outlived, but is terminated upon death. The generic life payout annuity provides no bequest for heirs, although spousal protection, in the form of joint-and-last-survivor, can be purchased at additional cost. Annuities can be viewed as longevity insurance, a type of mortality-contingent claim.

To create the contract, the annuity (insurance) company receives money from each person who buys a payout annuity. The funds received from each person are pooled into a collective pool from which claim payments are made. An insured person's annuity claim is contingent on continued life. The annuity payments are calculated so that each recipient gets the largest amount that the company can pay without exceeding the fund created from the accumulations of the entire group. The funds from people who die earlier than average support those who live longer than average. Many people purchase life annuities in order to be assured of an income they can't outlive. Others hesitate to select a lifetime payout annuity because they must give up control of the funds and hence the amount they can pass to their heirs. Just like other types of insurance, the amount and kind of immediate annuities an investor should own depends on many factors, including: (i) how risk averse he or she is; (ii) how much wealth has been accumulated; (iii) how much is the retirement need; (iv) how long he or she needs the savings to last; and (v) how strongly he or she feels about bequest. The fees and costs of annuity investments relative to other investment vehicles (such as mutual funds) as well as the tax structure and the investor's tax bracket also have impacts on the optimal allocations.

Despite the importance of this decision to each and every retiree, there have been relatively few scholarly papers written or models developed on the normative topic of the optimal allocation to immediate annuities. Most of the literature tends to focus on a positive economic analysis of the immediate annuity market.

For example, a substantial body of literature has documented the extremely low levels of voluntary annuitization exhibited amongst elderly retirees. Strictly speaking, this phenomenon is inconsistent with results of the life-cycle model of savings and consumption disclosed by M. Yaari in "Uncertain Lifetime, Life Insurance and the Theory of the Consumer", *Review of Economic Studies*, Vol. 32, pp. 137–150, (1965). Yaari examines a standard Ando & Modigliani life-cycle model of savings and consumption with no bequest motives, and demonstrates that all consumers hold "actuarial notes" (immediate annuities) as opposed to liquid assets. Yaari's study implies that when given the chance, retirees should convert their liquid assets to life annuities, which provide longevity insurance and protection against outliving one's money. The rationale behind Yaari's result is that returns from actuarial notes (life annuities) dominate all other assets because the "living" inherit the assets and returns of the "dead". Moreover, at older ages, the higher probability of dying increases the relative return, conditional on survival, from actuarial notes.

Nevertheless, despite the highly appealing arguments in favor of annuitization, there is little evidence that retirees are voluntarily embracing this arrangement. Notably, very few people consciously choose to annuitize their marketable wealth. In the comprehensive Health and Retirement Survey (HRS), conducted in the U.S, only 1.57% of the HRS respondents reported annuity income. Likewise, only 8.0% of respondents with a defined contribution pension plan selected an annuity payout. The U.S. based Society of Actuaries, conducted a study that shows that less than 1% of variable annuity (VA) contracts were annuitized during the 1992–1994 period.

Brugiavini discloses a conventional model in "Uncertainty Resolution and the Timing of Annuity Purchases", *Journal of Public Economics*, Vol. 50, pp. 31–62, (1993). Brugiavini examined the optimal time to annuitize, and concludes that it should be early in the life cycle. However, Brugiavini's model assumes that assets earns the same risk-free rate of return, and does not examine the best asset mix for annuities. In a similar vein, Blake, Cairns and Dowd (2000) "PensionMetrics: Stochastic Pension Plan Design during the Distribution Phase", *Pensions Institute Working Paper* conducted extensive computer simulations to determine the annuity and pension draw down policy that provides the highest level of (exponential) utility. However, Blake et al. did not examine the implications of annuitizing at different ages, as it pertains to the best time to annuitize, or the best asset mix within the annuity.

In related research, S. Kapur and J. M. Orszag introduced immediate annuities into a Merton (1971) framework in "A Portfolio Approach to Investment and Annuitization During Retirement", *Birbeck College (University of London) Mimeo*, May 1999. This study assumed that the risk-free rate is augmented by a mortality bonus that is proportional to the instantaneous hazard rate. However, this study ignored variable immediate annuities and the irreversibility of the annuity contract. As such, their results are difficult to apply in a portfolio context.

One-Period Model

A life payout annuity is a financial investment whose returns are enhanced by pooling mortality risk with others. Here is a simple example of a one-period life annuity that illustrates the concept of risk pooling. According to U.S. life tables compiled by the Center for Disease Control and Prevention (FIG. 1), there is a 20% chance that any given 95-year-old (white) female will die during the next year. In other words, for any given large group of 95-year-old females, 20% will not survive for another year. Of course, it is not possible to determine which 20% will not survive.

Now, imagine that five such 95 year-old females entered into the following legally binding agreement. Each of the five females has agreed to contribute $100 to a communal fund that will invest in Treasury bills yielding 5%. Then, according to the contract, at the end of the year, only the surviving females will be entitled to split the proceeds of the fund.

Clearly, the total contribution of $500 will grow to $525 by the end of the year. And, if all five females are still alive—they are now 96 years old—they will each receive $105. This is precisely the $100 investment, plus interest. If one of them dies during the next year, the remaining four will be entitled to split the $525, giving each a total of $131.25. Recall that the agreement stipulated that those who die cede control of their assets. The four survivors will therefore gain a return of 31.25% on their money. In fact, if two happen to die, the remaining three will get $175, which is an impressive 75% return on their money. In other words, the survivors' gains are comprised of their original principal, their interest, and other people's principal and interest. By pooling mortality risk and ceding bequests, everyone gains.

Technically, this agreement is called a tontine, also known as a pure endowment contract which will be referred to hereinafter as a one-period life annuity contract.

Of course, with only five females in the mortality pool, six different things can happen. In the two extreme cases, they all might die, or they all might survive. But with 10,000 such females entering into a one-period annuity agreement, it is pretty much assured that the $1,050,000 will be split among 8,000 survivors. In other words, the expected return from the contract for the survivors is (1,050,000/8,000)=$131.25, or a 31.25% gain. The numerator is the total return for the pool, and the denominator represents the survivors.

Algebraically, if R denotes the risk-free interest rate (U.S. Treasury Bills) per period, and p is the probability of survival per period, then the return from the one-period annuity is $(1+R)/p-1>R$, where p denotes the probability of survival. This is the return for the survivors. And again, the reason the return is greater than R is because the dead subsidize the living. Furthermore, the smaller the p, the greater is the $1/p$ and the greater is the return from the one-period life annuity.

Now, this arrangement is not as outrageous or artificial as it may first sound. In fact, it is the principle underlying all immediate annuities, and all pension plans for that matter. In practice, the agreement is made over a series of periods, as opposed to just one. But the mechanics are the same, and the survivors derive a higher return compared to placing their funds in a conventional asset (non-mortality contingent) asset.

Although the example we have provided assumes that R (the risk-free interest rate) is fixed, the same would apply for a Variable and unknown return denoted by X. Moreover, the exact same principle would apply with a variable investment return as well. In fact, the returns might be even higher. Namely, the 10,000 females can invest their $100 in a stock mutual fund that earns 5%, or 10% or even 20%. They do not know in advance, what the fund/pool will earn. At the end of the year, the annuitants will learn (or realize) their investment returns, and then split the gains among the surviving pool. Moreover, in the event the investment earns a negative return, i.e., loses money, the participants will share in the losses as well, but the effect will be mitigated by the mortality credits.

If five females invest $100 in a fund that earns a random return, the expected return for the survivors is $(1+X)/p-1>X$. This concept is the foundation of a variable immediate annuity, which is the counterpart to a fixed immediate annuity.

Both fixed and variable immediate annuities provide longevity insurance via the mortality credits but with fixed annuities the pool has been invested in fixed income securities, and with variable annuities the pool has been invested in variable return (read stocks, real estate, etc.) securities. The choices and decisions made between fixed and variable immediate annuities are identical to the choices between fixed and variable accumulation products. The optimal allocations should depend on the participant's risk aversion, comfort with the fluctuating stock market, time horizon, and budgeting requirements.

As such, the fixed immediate annuity is one particular asset class within the portfolio of longevity insurance products. Thus, providing a fixed immediate annuity without access to a variable immediate annuity is akin to offering a money market and bond fund in a (pension) savings plan without providing equity-based products to span the risk and return spectrum.

In practice, only insurance-chartered companies are authorized to provide these mortality-contingent products. In fact, most insurance companies go one step further and actually guarantee that you will receive the mortality credit enhancements, even if the mortality experience of the participants is better than expected. In other words, in the above-mentioned example, with an expected 20% mortality rate, they would guarantee that all survivors receive 31.25% on their money, regardless of whether or not 20% of the group died during the year.

Insurance companies are able to provide this guarantee by making very careful and conservative assumptions about the rate of return earned on assets. Furthermore, the greater the number of insurance annuities an insurance company sells, or has on its books, the lower the risk is in providing this guarantee. These are the ultimate economics of scale. In other words, the risks might be significant if they only sold five such policies, but with 500,000 policies, the probability of an adverse outcome is close to zero.

SUMMARY OF THE INVENTION

One aspect of the invention provides a system, method and machine-readable medium for allocating assets of an investor portfolio among annuity and nonannuity assets. According to this method, at least one probability of survival of the investor is retrieved. The investor selects, or has selected for him or her, a utility of consumption and a utility of bequest. Characteristics of a plurality of nonannuity assets and a plurality of annuity assets are retrieved, these characteristics including for each kind of asset at least one differentiating characteristic or moment, such as risk (standard deviation of return), an expected rate of return (based on a lognormal or other random distribution) or other measurable differentiating characteristic (such as skewness and kurtosis). In a preferred embodiment the method maximizes an objective utility function which is calculated as the sum of a utility of live state and a utility of a dead state, and takes into account the relative risk aversion of the investor. The live state and dead state utilities in turn are calculated as functions of the retrieved expected rates of return and values of a plurality of investment weighting factors, each weighting factor being attributed to a respective one of the annuity or nonannuity assets. Once a maximum of the objective utility function has been found, the investment weighting factors that result in that maximum can be used in allocating assets in the investor's portfolio or alternatively can be used by a portfolio manager to compare present allocations with optimum allocations. Preferably, the chosen objective utility function should account for the following factors:

(i) the investor's risk tolerance;

(ii) the investor's age;

(iii) the investor's subjective and objective probabilities of survival;

(iv) the investor's utility of consumption, and his or her utility of bequest;

(v) the expenses and fees of annuity and nonannuity assets, and (vi) risk and return characteristics of each of the assets to which a portion of the investor's wealth could be allocated.

In a preferred embodiment, two different probabilities of survival of the investor are retrieved, an objective probability of survival which is actuarially determined on the basis of age, gender and possibly ethnic origin and a subjective probability of survival which depends upon the investor's own perception of health, genetic factors, etc. The subjective probability of survival is used to apportion the investor's wealth between the utility of the live state and the utility of the dead state. The objective probability of survival is used to determine effective rates of return for each of the annuity assets.

Various optimization methods can be used to find a maximum of the objective utility function. In several embodiments, all but one of the investment weighting factors each supplies an additional dimension to a search space, so that a space is created with (n−1) dimensions if there are n investment weighting factors. The last investment weighting factor is found by subtracting the other weighting factors from unity. The (n−1) dimensional search space is subdivided using any one of several known search algorithms, including a Golden Mean search, a Fibonacci search, the Method of Feasible Directions, simulated annealing or a basic "decimal" search in which the space is divided into a number of cells of equal dimension, the maximum cell is determined, and that cell is divided in turn.

After subdivision each cell is evaluated to see if the maximum occurs within it. The evaluation can be performed by a numerical integration method such as Simpson's Rule or the Adapted Simpson's Rule. The integrating function incorporates a measure of the investor's relative risk aversion. A number of division/evaluation passes are made until the maximum has been located to within a predetermined margin of error.

Systems and media are provided to carry out the above embodiments of the invention.

BRIEF DESCRIPTION OF THE DRAWINGS

Further aspects of the invention and their advantages can be ascertained from the detailed description set forth below, when taken in conjunction with the drawings, in which like characters illustrate like parts and in which:

FIGS. 1A–1C show an actuarial table of probabilities of survival for a relatively healthy population of potential annuitants;

FIG. 2A is a chart showing the allocation among the four asset classes as a function of risk aversion when the investor only cares about bequest;

FIG. 2B is a graph of the data presented in FIG. 2A;

FIG. 3A is a chart showing the allocation among the four asset classes as a function of risk aversion when the investor does not care about bequest;

FIG. 3B is a graph of the data presented in FIG. 3A;

FIG. 4A is a chart showing the allocation among the four asset classes as a function of risk aversion when the investor has a 20% bequest motive and an 80% consumption motive;

FIG. 4B is a graph of the data presented in FIG. 4A;

FIG. 5A is a chart showing the allocation among the four asset classes as a function of risk aversion when the investor has a lower subjective survival probability;

FIG. 5B is a graph of the data presented in FIG. 5A;

DETAILED DESCRIPTION OF THE ILLUSTRATED EMBODIMENTS

Figure 6:
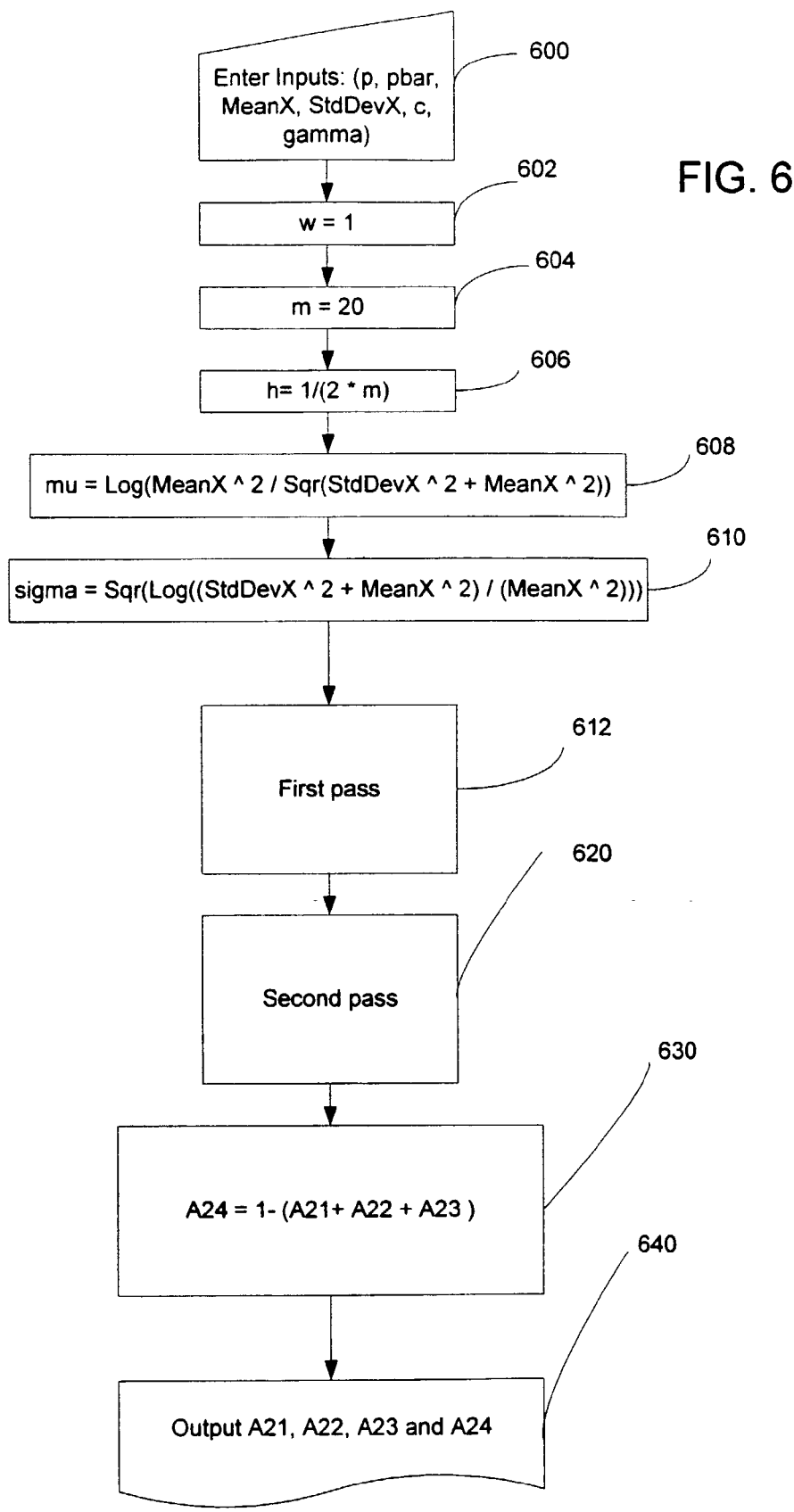
FIG. 6 is a flowchart of an embodiment of the invention in which a basic search and Simpson's Composite Rule over 2 m intervals are used to allocate the investor's wealth among two payout annuity and two nonannuity assets.

In the allocation model of the present invention it is assumed that the investor is choosing the allocations of his or her retirement portfolio to maximize his or her utility. In the illustrative embodiment, it is assumed that there are only four different assets to choose from: 1) a nonannuity risk-free asset; 2) a nonannuity risky asset; 3) an immediate fixed annuity; and 4) an immediate variable annuity. The present invention, however, is applicable to scenarios in which there are more kinds of assets available, and is further applicable to situations in which the number of nonannuity assets is not the same as the number of available annuity assets.

In another alternative approach to the four-asset scenario described below, the four asset classes illustrated herein can themselves be constructs or portfolios which consist of many other investment instruments whose riskiness and rate of return average to the values shown. Finally, it should be noted that while the illustrated embodiment assigns an equal rate of return for the nonrisky annuity R and the nonrisky non-annuity R, and an equal expected rate of return to a risky annuity X and a risky non-annuity X, this need not be the case.

The illustrated embodiment describes the invention using two primary investments (a stock mutual fund and a fixed-income mutual fund) and two immediate annuities based on these. But the invention has application to derivatives as well, such as options, collars and floors. Further, the selected assets to which the allocable wealth is to be distributed may not behave linearly; many immediate variable annuity (IVA) products have downside protection, such that the random return variable associated with the asset is truncated on the bottom. The category matrix below summarizes the random returns from the four possible asset classes shown in the illustrated embodiment.

TABLE #1

The four basic asset classes

|  | Alive | Dead |
|---|---|---|
| Risk-Free Asset (T-bills): | R | R |
| Risky Asset (Equity): | $\tilde{X}$ | $\tilde{X}$ |
| Immediate Fixed Annuity: | $(1 + R)/p - 1$ | 0 |
| Immediate Variable Annuity: | $(1 + \tilde{X})/p - 1$ | 0 |

Each of these four assets is assigned a respective investment weighting factor $a_1$, $a_2$, $a_3$ or $a_4$ The present invention finds the asset allocation weights or investment weighting factors $\{a_1, a_2, a_3, a_4\}$ that maximize the objective function:

$$E[U(W)] = \bar{p} \times A \times E[u(a_1 wR + a_2 w\tilde{X} + a_3 wR/p + a_4 w\tilde{X}/p)] + (1-\bar{p}) \times D \times E[u(a_1 wR + a_2 w\tilde{X})] \quad (1)$$

such that $$a_1 + a_2 + a_3 + a_4 = 1$$

$$a_i > 0$$

In the above function:
  w denotes the initial wealth level
  W denotes the final wealth level
  A denotes the relative strength of the utility of consumption.
  D denotes the relative strength of the utility of bequest. The sum of A and D is assumed to be one, so there is only one free variable. Individuals with no utility of bequest will be assumed to have D=0. In other words, the investor chooses A and D according to the amount of wealth the investor wishes to leave to his or her heirs. In the preferred embodiment, it is assumed that A and D≧0 and A+D=1, but A and D can be chosen otherwise.
  p denotes the one period objective probability of survival, which is the probability that is used by insurance companies to price immediate annuities. This factor can be retrieved from an actuary table and varies according to age, gender and ethnic origin, although it can be chosen as a function of less than all of these three factors.
  $\bar{p}$ denotes the subjective probability of survival. The subjective probability of survival may not match the objective (annuitant) probability. In other words, a person might believe he or she is healthier (or less healthy) than average. This would impact the expected utility, but not the payout from the annuity, which is based on objective (annuitant) population survival rates.
  $\tilde{X}$ denotes the (one plus) random return from a preselected risky asset, e.g., equities, and R denotes the (one plus) risk-free rate of return of a relatively risk-free asset, e.g., U.S. Treasury Bill rate. In the illustrated embodiment, it is assumed that one pair of risky annuity and nonannuity investment vehicles can be chosen to both have a net return $\tilde{X}$, and that another, less-risky pair of annuity and nonannuity investment vehicles can be chosen which have a net return R.
  The expression $E[u(\alpha 1 wR + \alpha 2 w\tilde{X} + \alpha 3 wR/p + \alpha 4 w\tilde{X}/p)]$ denotes the utility from the live state, while $E[u(\alpha 1 wR + \alpha 2 w\tilde{X})]$ denotes the utility from the dead state. Notice that the annuity terms, which are each divided by the objective probability of survival, do not appear in the dead state. This is because the annuity does not pay out if the investor dies, but the nonannuity assets still do. The ratio of risk free to risky assets is determined as a function of the investor's relative risk aversion, quantified herein as c and Gamma, as will be detailed below.
  The function u(.) denotes the standard utility function of end-of-period wealth.

A more general utility function applicable to m annuity assets and n annuity assets can be written as follows:

$$E[U(W)] = \bar{p} \times A \times E\left[u\left(\sum_{i=1}^{m} a_i \tilde{X}_i + \frac{1}{p}\sum_{j=1}^{n} b_j \tilde{Y}_j\right)\right] + (1-\bar{p}) \times D \times E\left[u\left(\sum_{i=1}^{m} a_i \tilde{X}_i\right)\right] \quad (2)$$

where
  $a_i$=investment weighting factor for ith nonannuity asset
  $\tilde{X}_i$=(one plus) random rate of return for ith nonannuity asset $b_j$=investment weighting factor for jth annuity asset
$\overline{Y}_j$=(one plus) random rate of return for jth annuity asset
m=number of nonannuity assets
n=number of annuity assets
$\overline{X}_i$ and $\overline{Y}_j$ are net of expense of fees.

In the above equation, within each asset group (annuity or nonannuity), it is assumed that each asset differs from each other asset in risk (measured for example by standard deviation) and return (measured for example as the mean of a distribution of random returns), and that the assets occupy points on an efficient frontier, i.e., as the degree of risk decreases, the degree of return decreases also.

The model of the present invention incorporates the following decision factors:

(i) Investor's risk tolerance;
(ii) Investor's age;
(iii) Investor's subjective probability of survival;
(iv) Population objective (pricing) probability of survival;
(v) Investor's "live" consumption and bequest;
(vi) Investor's utility from "live" consumption and bequest;
(vii) Expenses and fees of annuity vs. non-annuitized investment instruments (these are simply deductions from the gross returns in order to obtain net returns, in the illustrated four-asset example R and $\tilde{X}$); and
(viii) Risk and return characteristics of risky and risk-free assets.

In the illustrated embodiment the mean ($\mu$) and standard deviation ($\sigma$) have been used to define expected rate of return and risk, and the use of mean and standard deviation in turn assumes the use of a standard log-normal distribution. The probability density function for a log-normal distribution is:

$$LN(\mu, \sigma^2) \sim f(x) = \frac{1}{\sqrt{2\pi}\,\sigma x} e^{-((x-\mu)^2/\sigma)^2/2}, x \geq 0 \quad (3)$$

In the illustrated embodiment, the annuity and nonannuity equity-based instruments have a random return X within a distribution defined by two moments: a standard mean variation and a statistical log-normal mean. But other distributions can be used: standard normal, stable and other distributions that have more or less skewness and kurtosis. Similarly, the invention has application to models using serial correlations of returns.

For example, a standard normal distribution with no skew can be used. The probability density function for a standard normal distribution is:

$$N(\mu, \sigma^2) \sim f(x) = \frac{1}{\sqrt{2\pi}\,\sigma} e^{-((x-\mu)^2/\sigma)^2/2}, x \geq 0. \quad (4)$$

Alternatively a logistic distribution with fatter tails than a standard normal distribution can be used. A probability distribution function producing such kurtosis is:

$$f(x) = \frac{1}{1+e^{-x}} \quad (5)$$

Other distributions can be found in William H. Greene, Econometric Analysis, Prentice Hall, 3rd ed. (1997).

In the above expression (1), the ratio of risk-free to risky assets is chosen as a function of an investor-specific risk aversion factor, gamma, and consumption c. But there are literally endless ways of specifying the objective function (utility function) with respect to risk aversion. Here are three other commonly used examples.

a) Constant Relative risk aversion utility function (CRRA), where utility is a function of the wealth (W) and $\gamma$ is the measure of constant relative risk aversion and is always greater than zero.

$$u_{CRRA}(W) = \begin{cases} \frac{(W^{1-\gamma}-1)}{1-\gamma} & \text{for } \gamma \neq 1 \\ \ln(W) & \text{for } \gamma = 1 \end{cases} \quad (6)$$

b) Constant absolute risk aversion utility function (CARA), where utility is a function of the wealth (W) and $\gamma$ is the measure of an investor's constant absolute risk aversion and is non-negative.

$$u_{CARA}(W) = \begin{cases} -e^{-\gamma W} & \text{for } \gamma > 0 \\ W & \text{for } \gamma = 0 \end{cases} \quad (7)$$

c) Loss Aversion Constant Relative risk aversion Utility Function, where loss aversion is added to the standard CRRA function. $W_T$ is the wealth target, and $\lambda$ is the measure of loss aversion, always greater than one.

$$u_{LA}(W) = (W-W_T)^{r1} - \lambda(W_T-W)^{r2} \quad (8)$$

Optimization Of Utility Function

Once the utility function and its inputs have been defined, the next step is to find a maximum of it. Since in the illustrated four-asset embodiment the weights (a1, a2, a3, a4) sum up to one, we essentially have only three weights to solve. Since, as functions of ($\alpha$1, $\alpha$2, $\alpha$3), both E[U(W)] and its derivatives are defined by integrals that cannot be performed analytically, they must be performed numerically.

Although E[U(W)] is a non-linear function of the three free parameters ($\alpha$1, $\alpha$2, $\alpha$3), it is strictly concave, and hence one need only find a local maximum in order to find the global maximum.

Several methods exist for finding this maximum. The ones discussed herein involve (a) defining a search space, (b) dividing the search space into intervals, (c) evaluating the utility function within the interval by integrating it, (d) choosing which interval appears to have the maximum within it, and repeating steps (b)–(d) by subdividing the previously selected interval, until the maximum has been located to an acceptable level of accuracy.

A preferred search method uses the Golden Mean or Golden Section. According to this method, the optimal value of the objective utility function is assumed to have been bracketed in an interval [a,b]. In the present invention, the interval is defined by the variations of allocations across all permissible asset classes. In the four-asset class example this will vary from 100% nonannuity cash (or other relatively risk-free nonannuity investment), 99% cash+1% nonannuity equity (or other relatively risky nonannuity investment), . . . , to 100% variable income annuity (VIA). One then evaluates the utility function at an intermediate point x and obtains a new smaller bracketing interval, either [a,x], or [x,b]. This process continues until the bracketing interval is acceptably small. It is critical to choose x to be the optimal point between [a,b] so that the decrease in the interval length is maximized when the function is as uncooperative as it can be, i.e., when the luck of the draw forces you to take the bigger bisected segment. According to the golden section, the optimal bracketing interval point x between [a,b] should be a fractional distance 0.38197 from one end (say a), and 0.61803 from the other end (say b). This process can be expanded to a multi-dimension optimization.

For a general discussion on optimization methods, see William H. Press, Brian P. Flannery, Saul A. Teukolsky, and William T. Vetterling, *Numerical Recipes in C: the Art of Scientific Computing*, Cambridge University Press, 1988.

An alternative search method according to the present invention uses the so-called Method of Feasible Directions, which will be explained herein in further detail below.

In optimizing the four-asset objective utility function by the Method of Feasible Directions, the following steps are performed:

1) Choose an initial feasible point $B=(b_1, b_2, b_3)$ (i.e. $b_1 \geq 0$, $b_2 \geq 0$, $b_3 \geq 0$ and $b_1+b_2+b_3 \leq 1$).
2) Solve the following linear program for $(d_1, d_2, d_3, d_4)$:
    Maximize: $z=d4$
    Subject to:
    $-\nabla E[U(W)](B) \cdot D + d4 \leq 0$
    $-d1 \leq b1$
    $-d2 \leq b2$
    $-d3 \leq b3$
    $d1+d2+d3 \leq 1-(b1+b2+b3)$,
    where $\nabla E[U(W)](B)$ denotes the gradient of $E[U(W)]$ evaluated at the point B, $D=(d_1, d_2, d_3)$, and "·" denotes the dot product of two three-vectors. If $d_4=0$, then $X^*=B$ is the point at which $E[U(W)]$ is maximum; if not, then
3) Determine a nonnegative value for $\lambda$ that minimizes the single-variable strictly concave function $E[U(W)](B+\lambda D)$, while keeping $(B+\lambda D)$ feasible (that is, $b_1+\lambda d_1 > 0$, $b_2+\lambda d_2 \geq 0$, $b_3+\lambda d_3 \geq 0$, and $(b_1+\lambda d_1)+(b_2+\lambda d_2)+(b_3+\lambda d_3) \leq 1$). Let $\lambda^*$ denote this optimal value of $\lambda$.
4) Set $B=B+\lambda^* D$, and go back to step (2).

Step (2) requires (after restating the linear program in "standard" form) the use of the simplex algorithm. The second, third and fourth constraints will acquire slack variables when put in standard form, and the fifth constraint will acquire a surplus variable, and hence also an auxiliary (a.k.a. artificial) variable. Depending on the components of the gradient $\nabla E[U(W)](B)$, the first constraint may acquire either a slack variable or a surplus (and hence also an auxiliary) variable. In any event, the presence of at least one auxiliary variable will require the use of the Two-Phase Simplex Method; Phase I determines an initial feasible point of the linear program if it exists (in our case it does), and Phase II determines the optimal point of the linear program.

Technically, step (3) cannot be implemented as written above, since the condition "$d_4=0$" is likely never to be achieved in practice; as a result, a tolerance limit must be chosen for $d_4$, which will determine the number of iterations of the algorithm.

Step (3) will require an additional method such as the Fibonacci Search or Golden Mean Search (GMS) algorithms for maximizing a function of a single variable. According to a presently preferred MFD embodiment, the Golden Mean Search algorithm is used because it is easier to code compared with the Fibonacci Search algorithm and almost as fast. However, one of ordinary skill in the art will appreciate that other algorithms for maximizing a function of a single variable may readily be substituted. The number of iterations of the algorithm depends on the desired proximity of the calculated optimal point to the true optimal point.

Another search method which may be employed is a "basic" search, in which the search space is divided into a predetermined number of intervals, the function evaluated in each of them, one of the intervals then being chosen based on the maximum residing within it, the chosen interval then being subdivided into the predetermined number of subintervals, and repeating these steps until the maximum has been localized to within a predetermined degree of accuracy.

There are a number of ways to perform the required numerical integrations of $E[U(W)]$ and $\nabla E[U(W)]$; two are the Simpson's Composite Rule and the Adapted Simpson's Rule. For either, since the integrals in $E[U(W)]$ and $\nabla E[U(W)]$ are over the unbounded interval $[0,\infty]$ we must break the integral into one over $[0,1]$ and one over $[1,\infty]$. The variable of integration x in the $[1, \infty]$ interval is changed to $y=1/x$, therefore changing the interval to $[0,1]$, and the two integrals over $[0,1]$ are evaluated together. In certain cases, the numerical integration is not required. One such case is where the portfolio returns is log-normally distributed and the utility function is Constant Relative Risk Aversion. In this case, the moments of log-normal distribution are available numerically.

In one embodiment, the Adapted Simpson's Composite Rule is used because this technique makes it possible to impose a maximum error size by keeping track of the variation of the function being integrated, and using finer intervals where the function varies more, and larger intervals where the function varies less.

According to the illustrated embodiment, Simpson's Composite Rule is used with a "basic" search, by which are established 40 equally spaced subintervals over the interval $[0,1]$. For the interval $[1, \infty]$, the feasible region $\alpha_1 \geq 0$, $\alpha_2 \geq 0$, $\alpha_3 \geq 0$ and $\alpha_1+\alpha_2+\alpha_3 \leq 1$ is divided into a grid of cells of size $0.2 \times 0.2 \times 0.2$, and all of the nodes are evaluated to find the one $(A_{11}, A_{12}, A_{13})$ at which $E[U(W)]$ is greatest. Since $\alpha 1+\alpha 2+\alpha 3+\alpha 4=1$, we can substitute $\alpha 4=1-\alpha 1-\alpha 2-\alpha 3$. Therefore, we can treat $E[U(W)]$ and $\nabla E[U(W)]$ as a function of the three variables: $\alpha 1$, $\alpha 2$, and $\alpha 3$.

At the next stage, the part of the box $[A_{11}-0.1, A_{11}+0.1] \times [A_{12}-0.1, A_{12}+0.1] \times [A_{13}-0.1, A_{13}+0.1]$ which lies inside the feasible region is divided into a grid of cells of size $0.02 \times 0.02 \times 0.02$, and all nodes are searched to find the one $(A_{21}, A_{22}, A_{23})$ at which $E[U(W)]$ is the greatest ($A_{21}$, $A_{22}$, $A_{23}$ are three of the four asset allocation weights, with the fourth being determined from the preceding three). Finally, the part of the box $[A_{21}-0.01, A_{21}+0.01] \times [A_{22}-0.01, A_{22}+0.01] \times [A_{23}-0.01, A_{23}+0.01]$ which lies inside the feasible region is divided into a grid of cells of size $0.002 \times 0.002 \times 0.002$, and all nodes are searched to find the one $(A_{31}, A_{32}, A_{33})$ at which $E[U(W)]$ is the largest. The optimal point $(\alpha_1, \alpha_2, \alpha_3)$ is taken to be $(A_{31}, A_{32}, A_{33})$.

FIG. 6 is a flowchart showing an overview of one embodiment of the present invention which uses a basic search as above described to divide the search space, and Simpson's Composite Rule to evaluate each cell.

The first step 600 is the supply of the various inputs into the asset allocation engine, including p, $\bar{p}$, MeanX, StdDevX, c, and Gamma. The variable "p" represents the individual's objective probability of survival, whereas "pbar" ($\bar{p}$) represents the subjective probability of survival. According to the present embodiment, the objective probability of survival is determined from a look-up chart given the investor's age and gender and keyed into the model. However, one of ordinary skill in the art will appreciate that the system could be provided with an appropriate look-up table to determine the objective probability of survival if provided the appropriate parameters.

MeanX and StdDevX are the mean and standard deviation of a random distribution of returns (either lognormal or other distributions as previously discussed) from an investment in a relatively risky asset such as equities. This can be based on the realized, historical returns for these assets, or any other model or estimate known to those of ordinary skill in the art. Finally, c and Gamma are the coefficient of non-relative risk aversion and the coefficient of risk aversion, respectively.

In step 602, the value of "w" is set to 1 since the optimal asset mix does not depend on the initial wealth level w. The wealth level will affect risk aversion if the CRRA, CARA or LA risk aversion utility functions are used, but by the time the steps in FIG. 6 are carried out, the risk aversion variables have already been calculated or otherwise retrieved.

In steps 604 and 606 the number of increments (m) and the step size (h) to be used in the numerical integration of E[U(W)] are specified. According to the illustrated embodiment, the number of increments is set at 20 (m=20 and h=1/(2* m).

The number of increments impacts the accuracy of the numerical integration, and that accuracy may be increased by increasing the number of increments. However, there is a tradeoff between the number of increments and the speed of execution of the calculation.

In steps 608 and 610 the parameters mu and sigma of the Lognormal distribution of X (i.e. the mean and standard deviation of ln(X)) are determined.

Next, the first pass using Simpson's Composite Rule is performed in step 612, and the second pass is performed in step 620. The second pass using Simpson's Composite Rule yields the optimal asset mix for three of the four investment options with an acceptable degree of accuracy, and the fourth parameter is determined as shown in step 630 since the sum of all four parameters is by definition equal to unity (1).

Figure 7A:
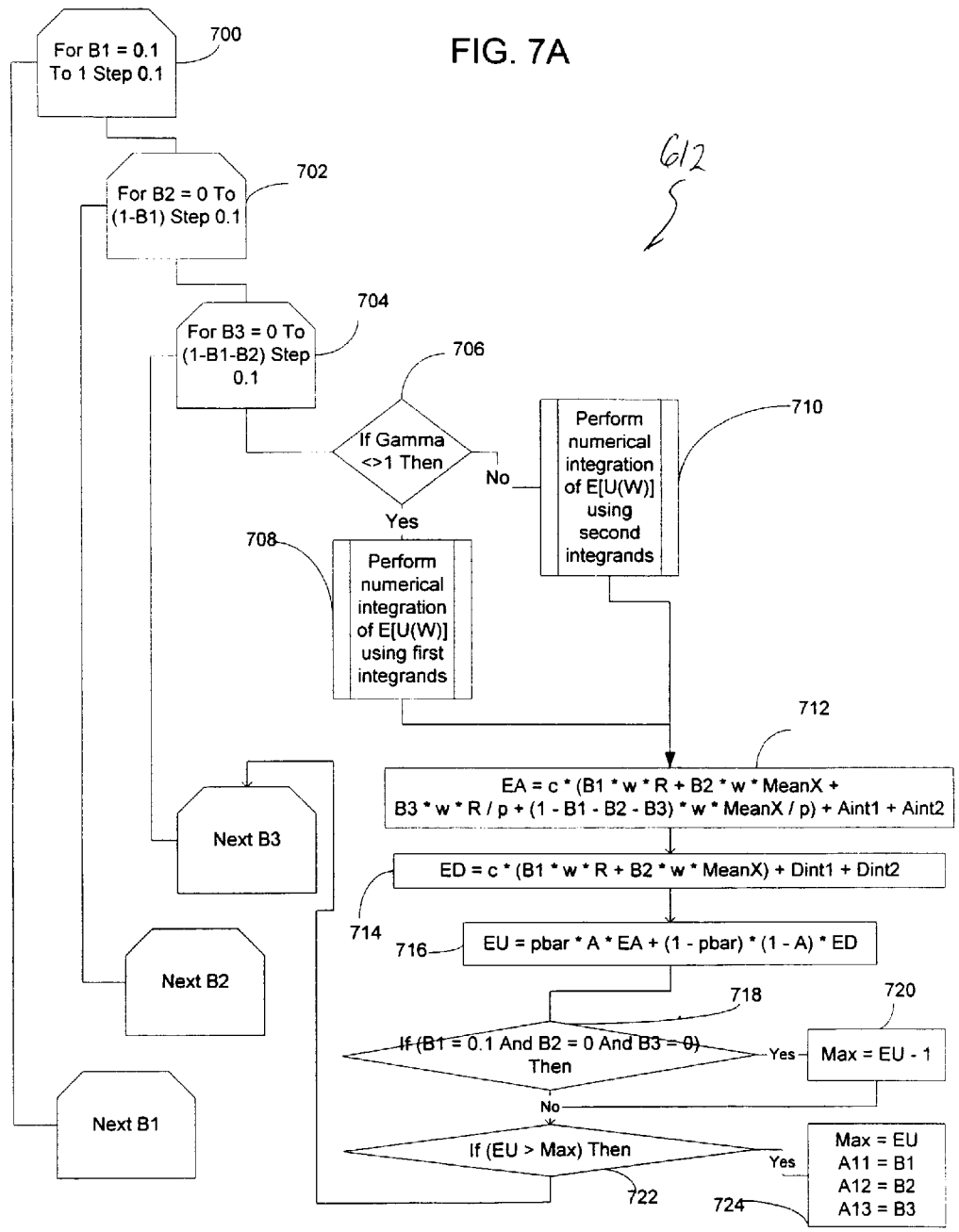
FIG. 7A is a flowchart detail of FIG. 6 illustrating steps of a first pass of the numerical integration to find the point at which E[U(W)] is maximized.

Details of the first pass 612 are illustrated in FIG. 7A. In the first pass, the point at which E[U(W)] is maximized is located using a grid with steps 0.1×0.1×0.1 over the simplex 0<=B1, 0<=B2, 0<=B3, B1+B2+B3<=1.

The flowchart of FIG. 7A includes nested for-next loops 700, 702, and 704 which are used to iteratively evaluate E[U(W)] at each point on the grid.

The integrands differ depending on whether Gamma< >1 or Gamma=1. According to the preferred embodiment, an if-then statement 706 is used to signal different processing depending on whether or not Gamma is 1.

If Gamma, the coefficient of risk aversion, is not equal to 1 then the integration is performed using first integrands 708. Alternatively, if Gamma is equal to 1 then the integration is performed using second integrands 710.

One of ordinary skill in the art will appreciate that in the for-next loop 700, B1 cannot be 0, since B1=B2=0 will lead to the expected utility of wealth in the "D" part of E[U(W)] being (-infinity). As will be explained below special allowances are necessary.

Figure 7B:
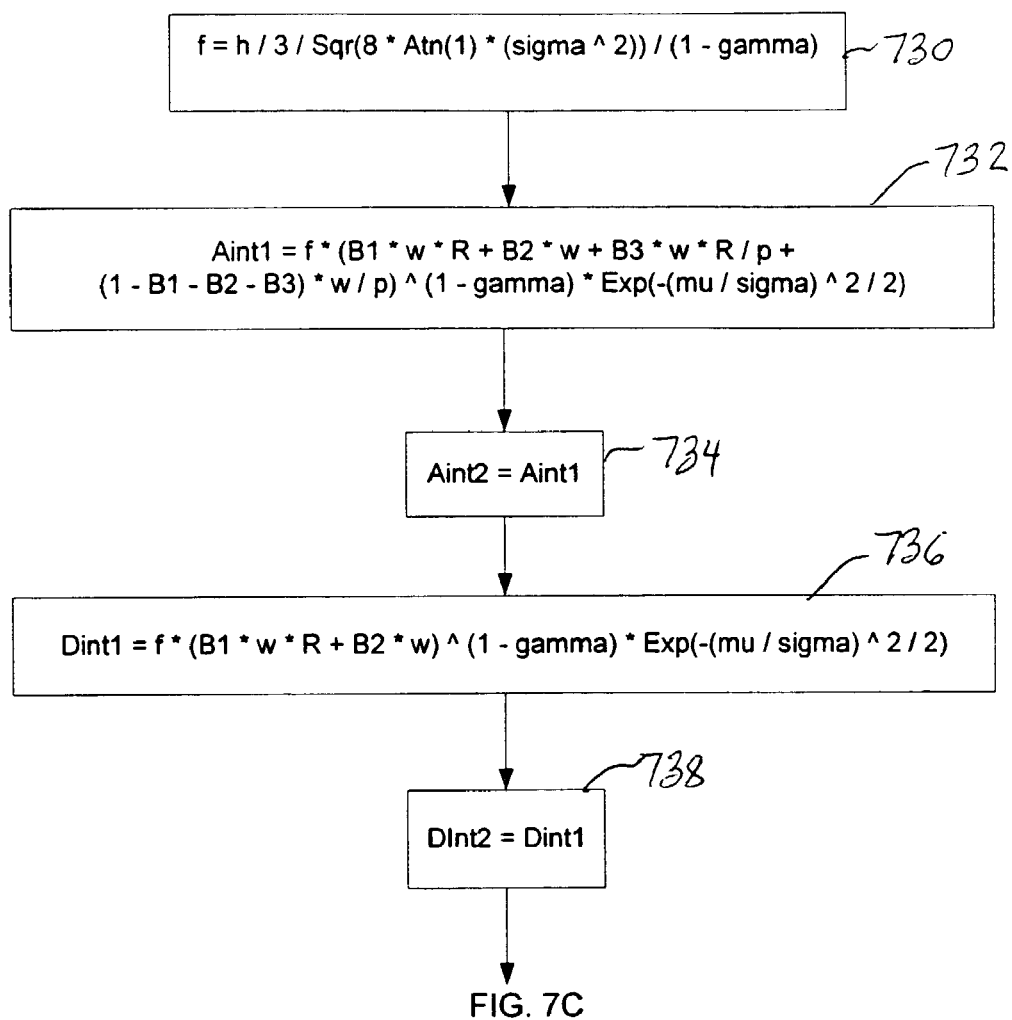
FIGS. 7B and 7C are flowchart details of FIG. 6 showing the integrands used when Gamma is not equal to 1.
Figure 7C:
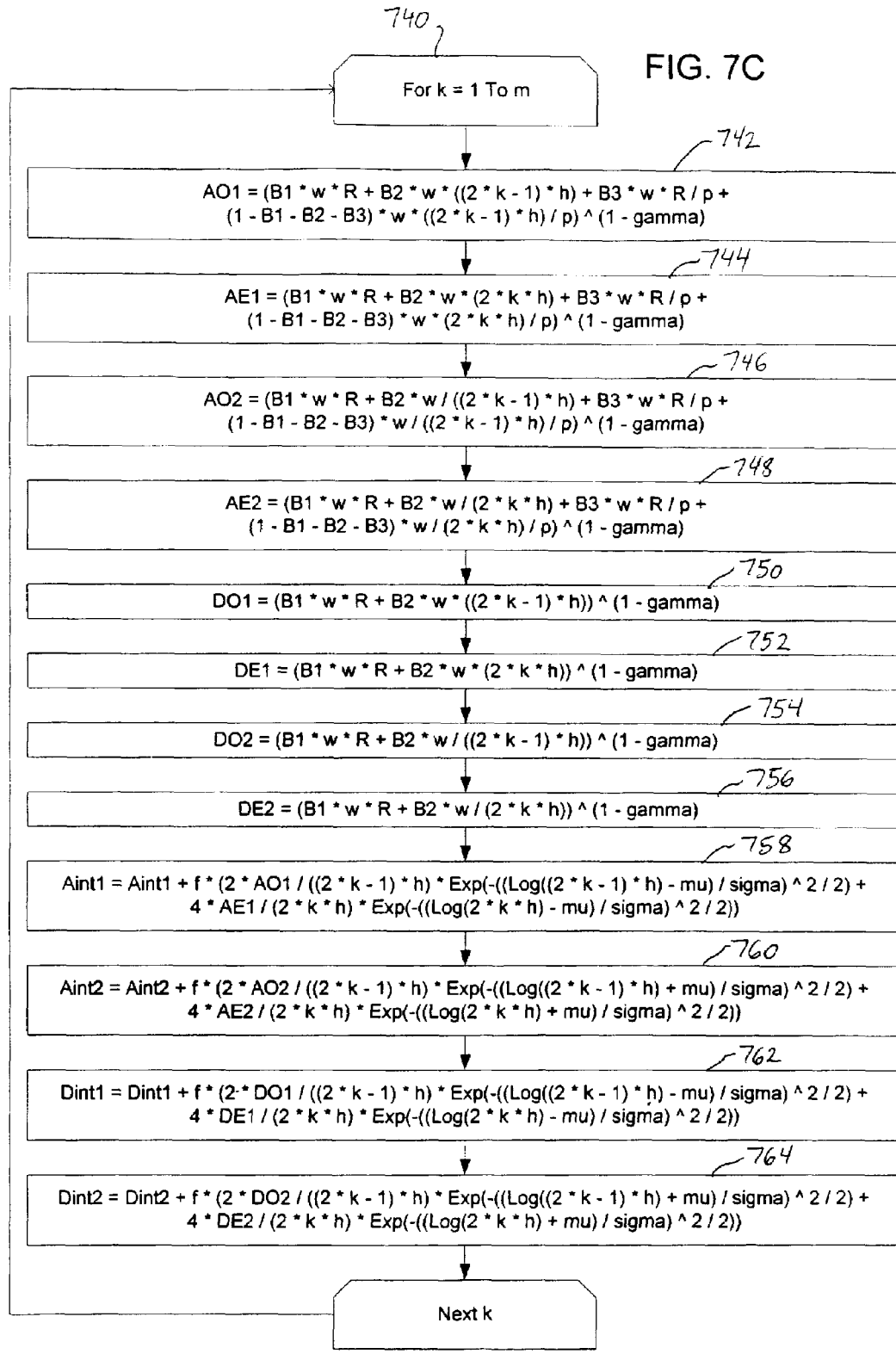

FIGS. 7B and 7C are flowcharts showing the various calculations performed (for both the first and second pass) to evaluate the numerical integration of E[U(W)] when Gamma is not equal to 1.

Figure 7D:
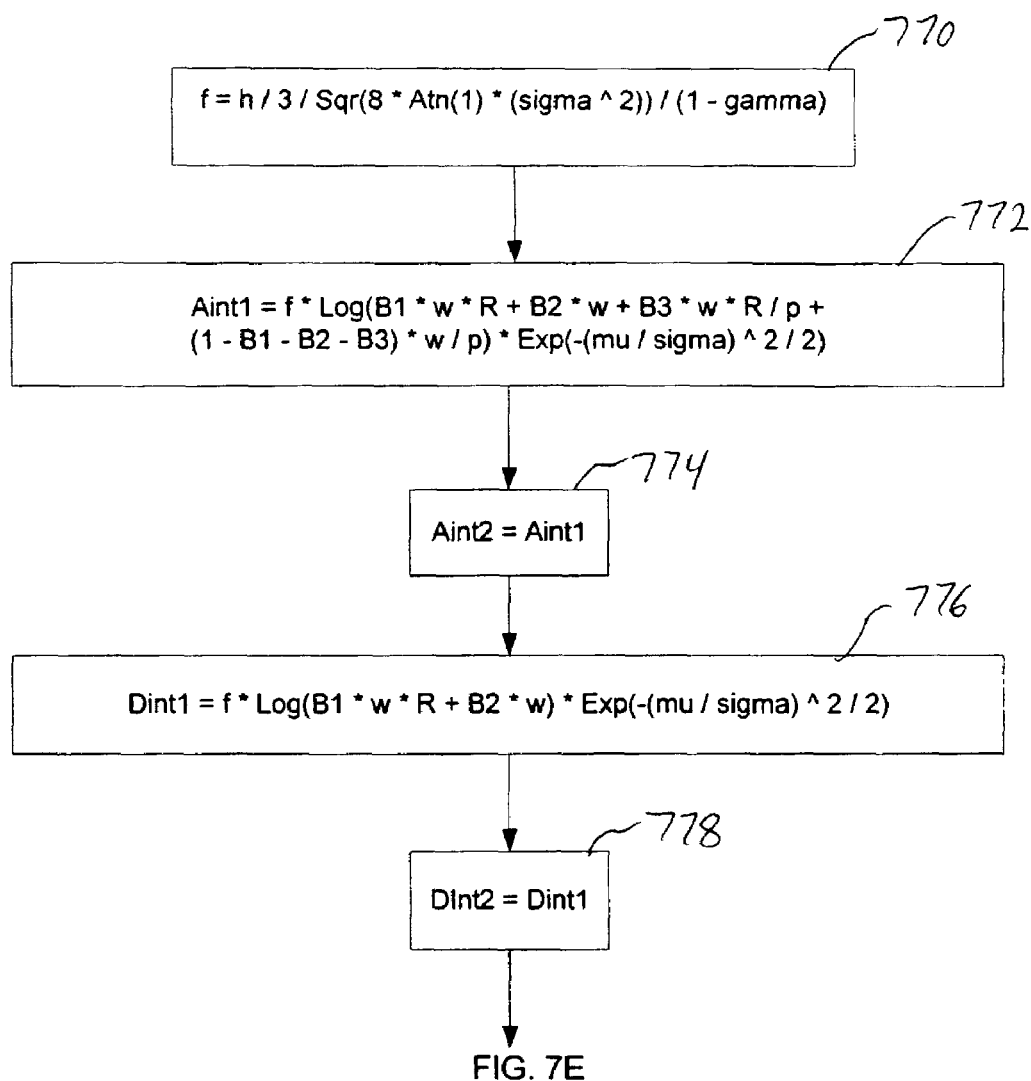
FIGS. 7D and 7E are flowchart details of FIG. 6 showing the integrands used when Gamma is equal to 1.
Figure 7E:
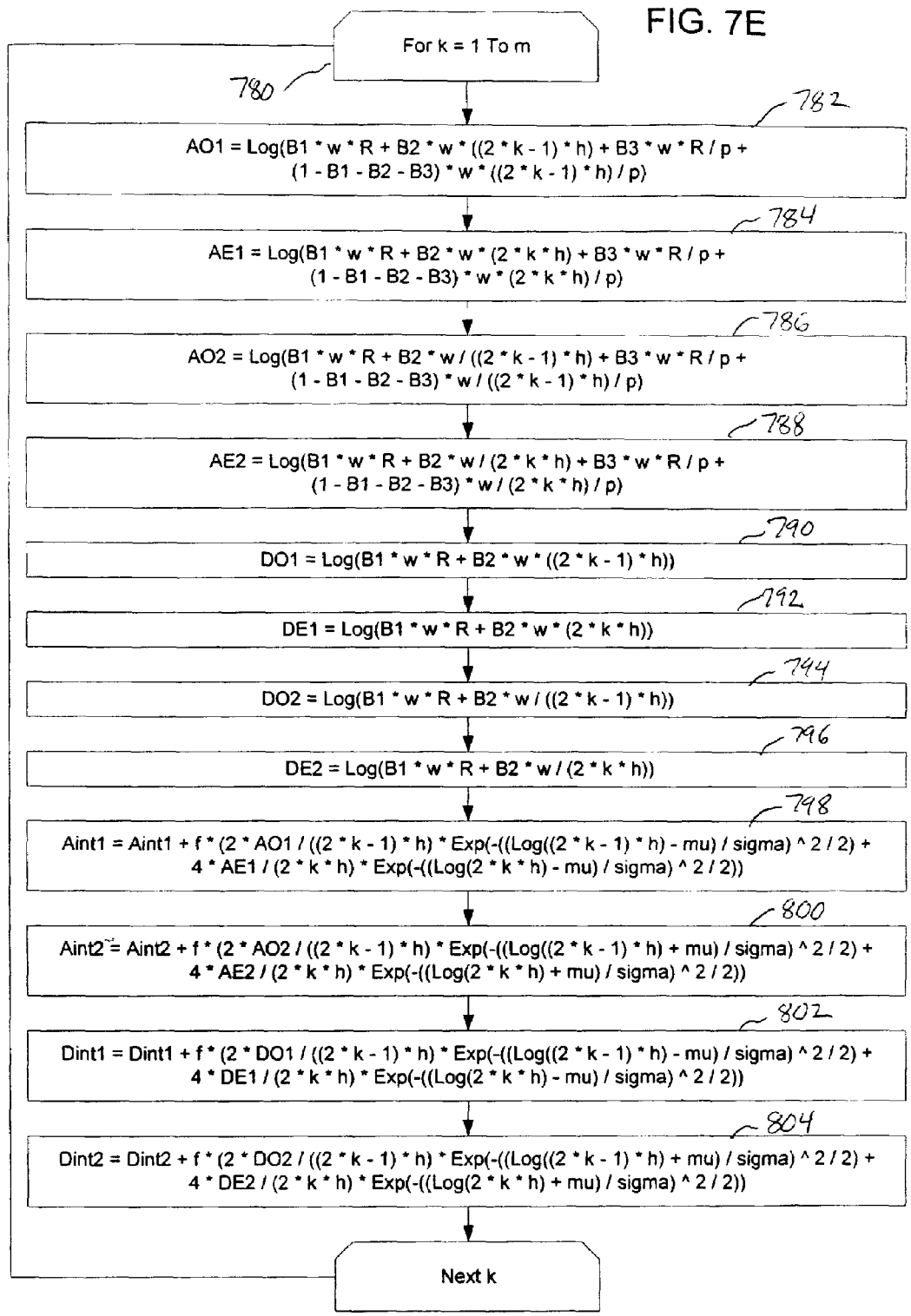

FIGS. 7D and 7E are flowcharts showing the various calculations performed (for both the first and second pass) to evaluate the numerical integration of E[U(W)] when Gamma is equal to 1.

Figure 8:
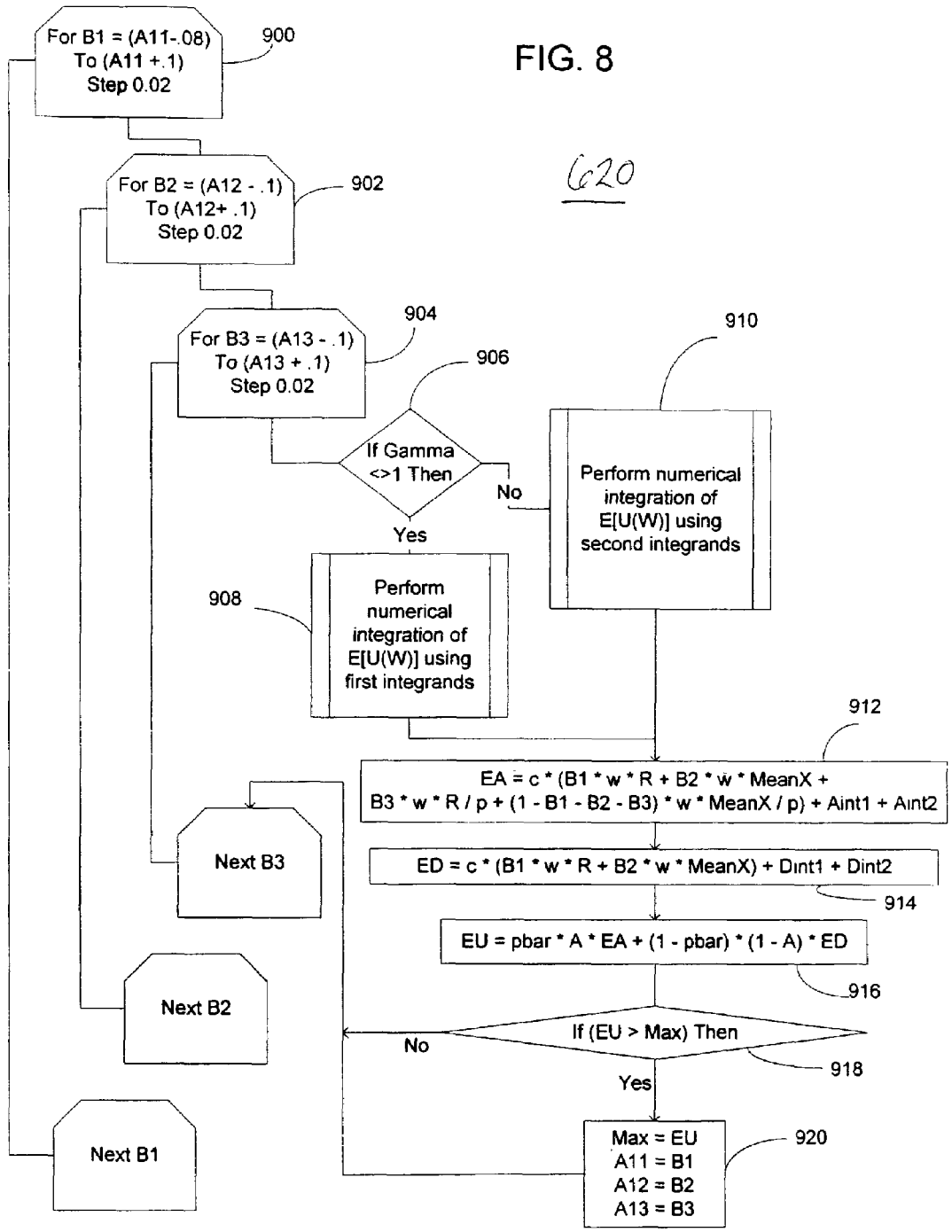
FIG. 8 is a flowchart detail illustrating a second pass of the numerical integration to find the point at which E[U(W)] is maximized.

Details of the second pass 620 are illustrated in FIG. 8. In the second pass, the point at which E[U(W)] is maximized is located using a grid with steps 0.02×0.02×0.02 over the simplex 0<=B1, 0<=B2, 0<=B3, B1+B2+B3<=1.

The flowchart of FIG. 8 includes nested for-next loops 800, 802, and 804 which are used to iteratively evaluate E[U(W)] at each point on the grid.

As shown in step 806, if Gamma, the coefficient of risk aversion, is not equal to 1 then the integration is performed using first integrands 808. Alternatively, if Gamma is equal to 1 then the integration is performed using second integrands 810. It should be noted that the same set of integrands are used in the second pass as were previously used in the first pass. Thus, when Gamma is not equal to 1 the various calculations shown in FIGS. 7B and 7C are performed. Likewise, FIGS. 7D and 7E show further detail of the steps used to evaluate the numerical integration of E[U(W)] when Gamma is equal to 1.

The variable f (calculated at 730 in FIG. 7B and at 770 in FIG. 7D) is an intermediate value which is used in calculating Aint1 and Dint1.

The variable Aint1 (732 in FIGS. 7B and 772 in FIG. 7D) denotes the numerical integral in the "A" part of E[U(W)], evaluated over [0,1].

The variable Aint2 (734 in FIGS. 7B and 774 in FIG. 7D) denotes the numerical integral in the "A" part of E[U(W)], evaluated over [1, ∞] by making the change of variable x−>y=1/x, and evaluating over [0,1].

The variable Dint1 (736 in FIGS. 7B and 776 in FIG. 7D) denotes the numerical integral in the "D" part of E[U(W)], evaluated over [0,1].

The function Dint2 (738 in FIGS. 7B and 778 in FIG. 7D) denotes the numerical integral in the "D" part of E[U(W)], evaluated over [1, ∞] by making the change of variable x−>y=1/x, and evaluating over [0,1].

The function atn(x) (see step 730 in FIG. 7B and step 770 in FIG. 7D) used in calculating the variable f is a standard mathematical function which returns the arctangent of the argument x.

As shown in FIGS. 7C and 7E, a For-Next loop 740, 780 is used to evaluate the intermediate terms at x=h, x=2h, x=3h. More particularly, the expressions 742–764 in FIGS. 7C and 782–804 in FIG. 7E are evaluated m-times (from k=1 to m), where m is the number of increments (20 according to the preferred embodiment).

One will recall that the B1, B2, and B3 denote the respective variables for the three nested loops used to span the grid.

In the expressions 742–764 in FIGS. 7C and 782–804 in FIG. 7E, "w" is set to 1 since the optimal asset mix does not depend on the wealth level w.

"R" is 1 plus the risk-free rate of return (e.g., 1.03).

"p" is the objective probability of survival.

"pbar" (p̄) is the subjective probability of survival.

"h" is the step size in the numerical integration of E[U(W)].

"Gamma" is the coefficient of relative risk aversion.

Referring back to FIG. 7A, after the numerical integration of E[U(W)] is performed in step 708 or 710, "EA" the expectation in the "A" part of E[U(W)], "ED" the expectation in the "D" part of E[U(W)], and "EU" the expectation in the "U" part of E[U(W)] are calculated 712–716.

In the steps 718 and 720, the value of "Max" is initialized during the first loop through For-Next loops 700, 702 and 704. Thereafter, in steps 722 and 724 the value of Max, A11, A12 and A13 are changed each time a new maximum value is detected for EU.

After the first calculation of EU, MAX is set to EU−1.

Referring back to FIG. 6, after the first pass 612, the optimal values are alpha_1=A11, alpha_2=A12, and alpha_3=A13. Leaving the value of Max unchanged after the first pass seems to lead to a logical error in the program due to roundoff error (the Max from the first pass is never quite achieved in the second pass). For this reason, the value of MAX is decreased by 1 (Max=Max−1).

FIG. 8 is a flowchart providing details of the second pass 620 (FIG. 6).

The second pass again uses three nested For . . . Next loops 900, 902, 904, to evaluate a grid with steps 0.02× 0.02×0.02 in order to locate the point at which E[U(W)] is maximized.

It should be appreciated that the outermost loop cannot start at B1=A11−0.1, since if A11=0.1, then B1=0, and this will lead to the expected utility of wealth in the "D" part of E[U(W)] being (−∞). For this reason, the outermost loop, B1 is initially set at A11−0.08, and is incrementally increased each pass by 0.02 until B1 is equal to A11+0.1.

Like the first pass (612 in FIG. 6), different integrands are used depending on whether Gamma is equal to 1.

As shown in step 906, if Gamma, the coefficient of risk aversion, is not equal to 1 then the integration is performed using first integrands 908. Alternatively, if Gamma is equal to 1 then the integration is performed using second integrands 910. It should be noted that the same set of integrands are used in the second pass as were previously used in the first pass. Thus, when Gamma is not equal to 1 the various calculations shown in FIGS. 7B and 7C are performed. Likewise, FIGS. 7D and 7E show further detail of the steps used to evaluate the numerical integration of E[U(W)] when Gamma is equal to 1.

Next, "EA", the expectation in the "A" part of E[U(W)], "ED", the expectation in the "D" part of E[U(W)], and "EU", the expectation of E[U(W)] are calculated in steps 912–916.

If a new maximal value for EU is determined in step 918, then the corresponding values of Max, A21 (second pass value of alpha_1), A22 (second pass value of alpha_2), and A23 (second pass value of alpha_3) are updated in step 920.

Referring once again to FIG. 6, the optimal values of A21, A22 and A23 (asset allocation weights) were determined during the second pass 620. All that remains is to derive the value of A24 (the fourth asset allocation weight) in step 630, and to output the optimal allocation weights in step 640. In step 630 A24 is simply determined as 1−(A21+A22+A23) since by definition A21+A22+A23+A24 must equal unity (1).

As will be explained below, the optimal allocation weights may be output in step 640 by displaying the results on a display screen (not shown) or printing the results on a printer or the like (not shown).

Preferably the found values $A_{21}$, $A_{22}$, $A_{23}$, $A_{24}$, are used to come up with a portfolio recommendation for individuals in retirement or close to retirement. The investment weighting factors $A_{21}$–$A_{24}$ may be directly attributed to four different investment vehicles or may be mapped on to a table of a larger number of investment vehicles. These weighting factors may be used to automatically generate or rebalance an existing investor's portfolio or may be presented to the investor for his or her possible modification before being finalized.

Figure 11:
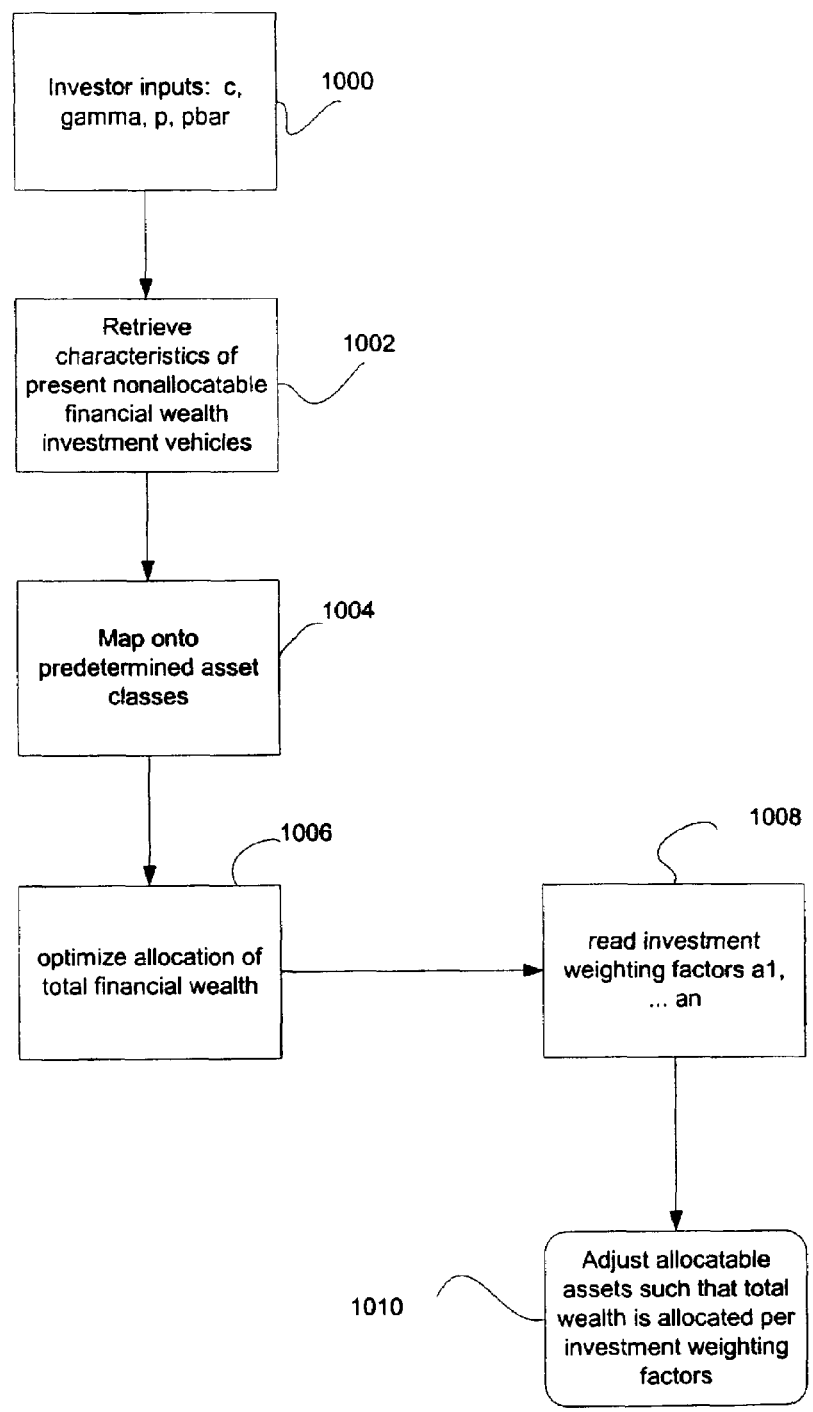
FIG. 11 is a flowchart showing use of the investment weighting factors where only a portion of an investor's financial wealth is allocatable.

In many cases, there will be some funds or investments of the investor which may not be reallocated—but it is still important that the overall financial wealth of the investor be correctly balanced among annuity, nonannuity, risky and relatively risk-free assets. This may happen, for example in a situation in which a financial planner has control over only a portion of the investor's financial investments. Such a case is illustrated in the flowchart of FIG. 11. At step 1000, the system will retrieve, or will query the investor for, his or her characteristics relative to investments: a measure of consumption c, a measure of risk aversion γ, and objective and subjective probabilities of survival p and pbar. At step 1002, and perhaps as a result of an investor interview whereby the above factors are also obtained, the characteristics of the present nonallocatable assets are obtained, such as mean expected return, standard deviation, whether the investment is an annuity or nonannuity, and dollar value. At step 1004 these characteristics are used to map the nonallocatable assets into predetermined asset classes which the system uses to determine optimum allocations; for example, these asset classes can be the same as the ones used in the embodiment illustrated in FIGS. 6–8.

At step 1006, the entire financial wealth of the investor is optimized according to the method of the invention as described herein. This will output investment weighting factors $a_1$ $a_n$. At step 1010, the amounts of wealth in the allocatable assets are adjusted to that the total financial wealth of the investor is allocated according to the investment weighting factors.

Figure 12:
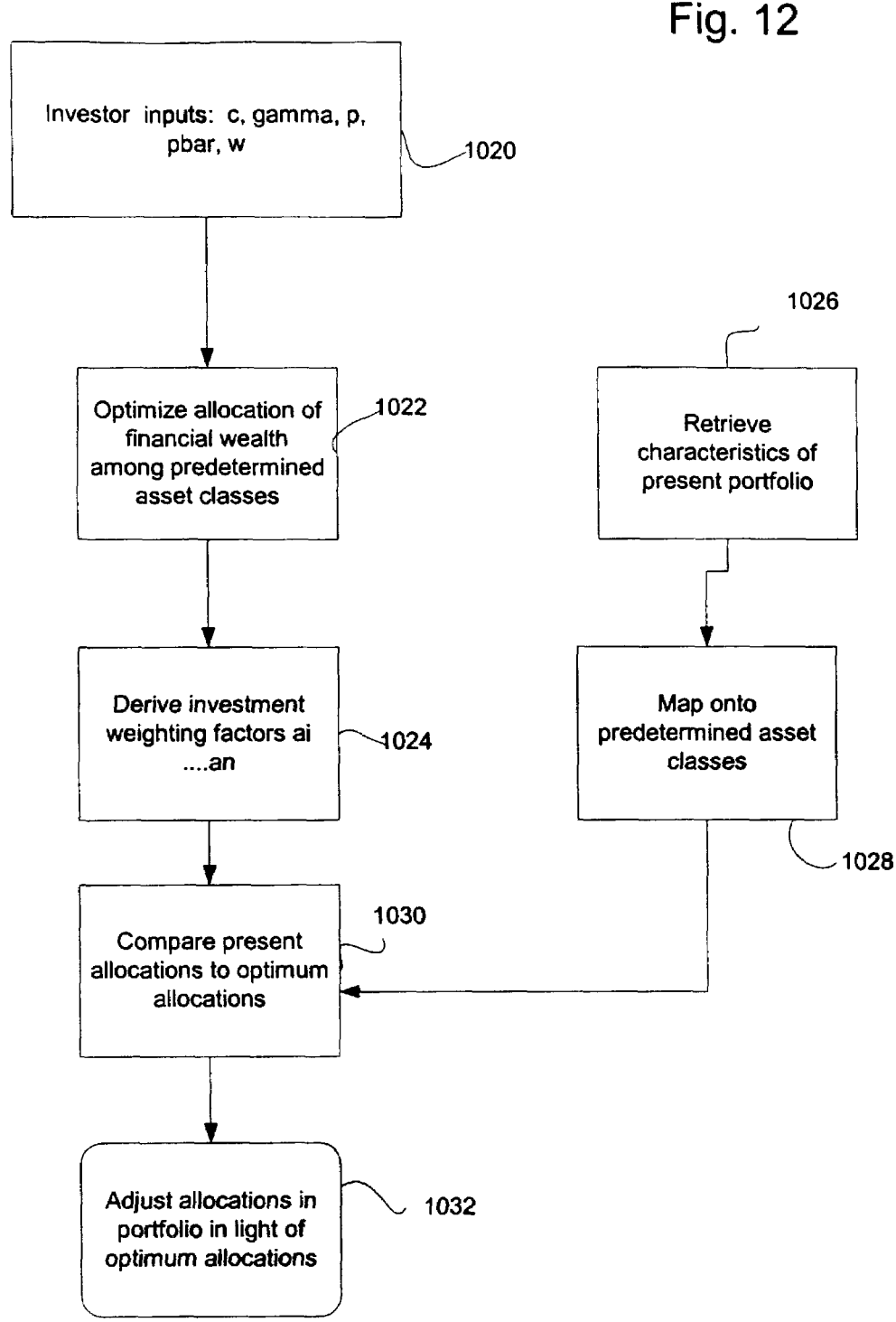
FIG. 12 is a flowchart showing use of the investment weighting factors to reallocate assets under control of a financial manager.

In an alternative embodiment, the investment weighting factors can be used to construct better products, typically by adding annuity assets to existing investing company products. In another alternative, the investment weighting factors can be used as a tool by a financial planner to reallocate the assets of an investor after making a comparison to present assets. Such a use for the investment weighting factors is shown in FIG. 12. At step 1020, the investor characteristics c, γ, p and pbar are obtained, as above. An optimum allocation of the investor's portfolio is calculated at step 1022 using one of the methods described herein. This outputs investment weighting factors $a_i$ . . . $a_n$ at step 1024. Meanwhile, at step 1026 the present financial characteristics of the vehicles in the investor's portfolio are retrieved, including dollar values, riskiness and whether or not the vehicle is an annuity. Using these characteristics the present investment vehicles are mapped onto predetermined asset classes at step 1028.

At step 1030, the present allocations are compared with the optimum allocations. Then at step 1032, the actual allocations are adjusted in light of the recommended allocations.

Figure 9:
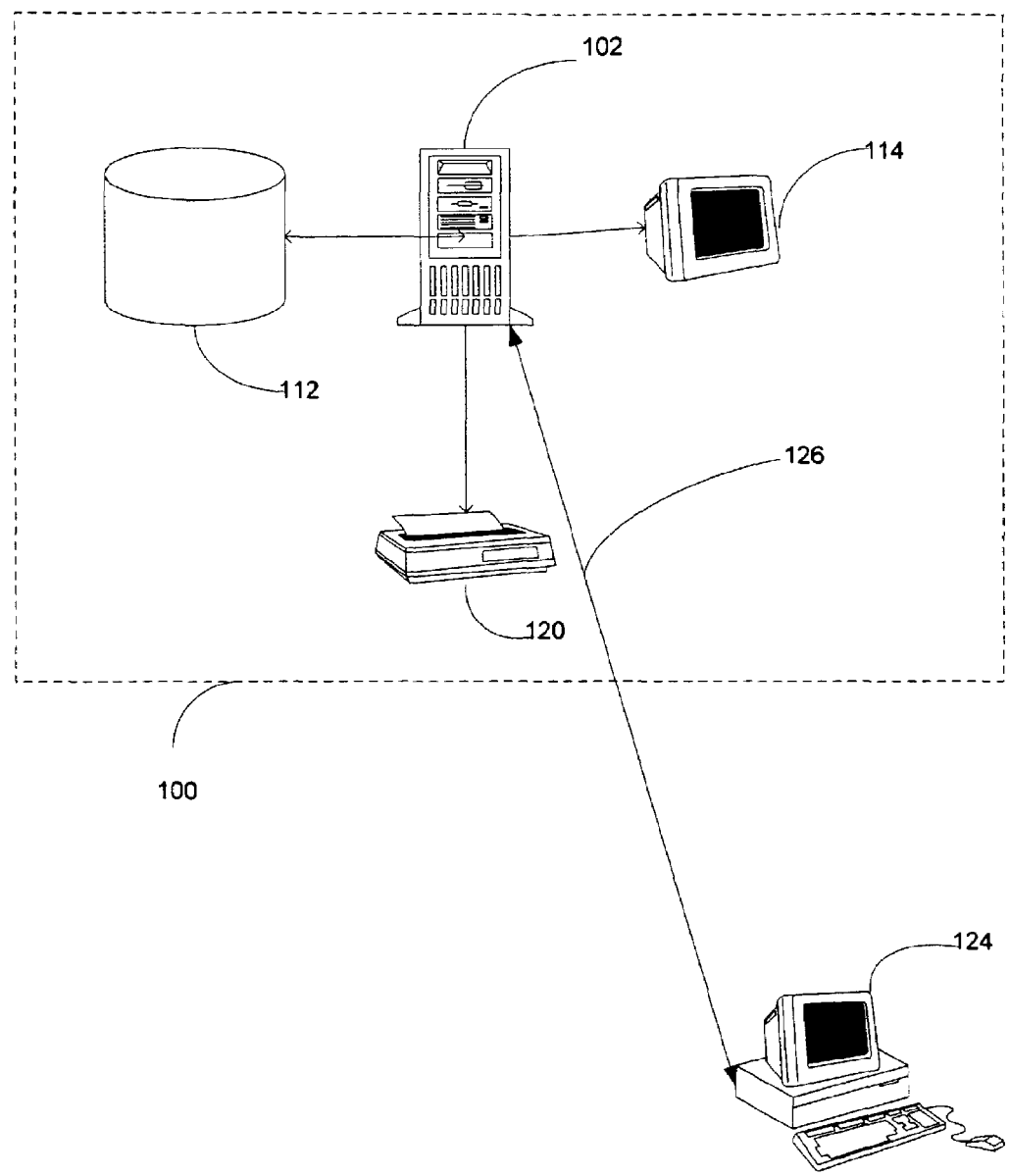
FIG. 9 is a schematic diagram of a system for carrying out the invention.

A representative system suitable for carrying out the invention is illustrated in FIG. 9. An asset allocation system 100 may be assembled around a programmed, general-purpose computer 102 having so-called personal computer ("PC") architecture; alternatively, other computers may be used, an example being a minicomputer such as those made by Sun Microsystems.

Figure 10:
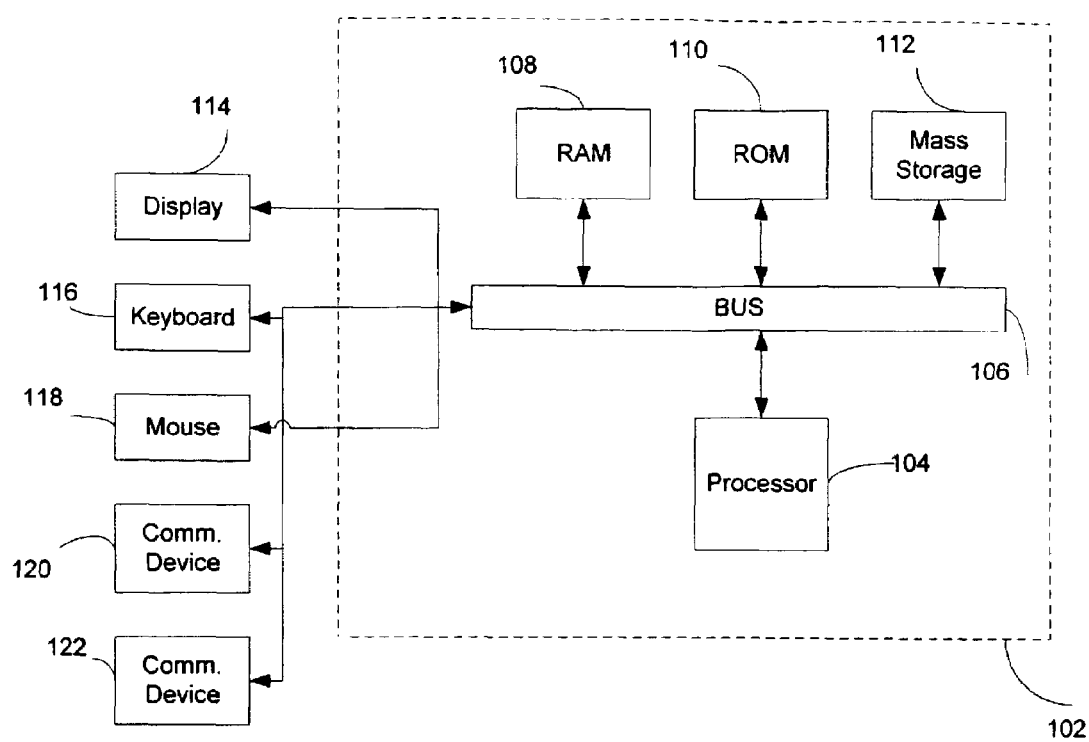
FIG. 10 is a diagram illustrating typical internal architecture of a personal computer suitable for carrying out the invention.

Referring to FIG. 10, a highly schematic internal architecture of the computer 102 is shown. In the preferred embodiment, the computer 102's main logic is embodied by a general-purpose, programmable microprocessor 104, which in conventional practice will have an on-board memory cache (not shown) and which may be associated with one or more mathematics or other special-purpose coprocessors (not shown). The processing logic generally represented by processor 104 is connected by a bus structure 106 to the various other components of the computer 102. To execute the algorithm shown in FIGS. 6–8 where that algorithm is written in Visual Basic, at least a Pentium 3 600 MHz processor is recommended.

The schematic representation of bus 106 is shown in FIG. 10 as a simple and unitary structure, but in conventional practice, as is known to those in the art, there usually are several buses and communication pathways 106, operating at different speeds and having different purposes. Further, bus 106 may be segmented and controlled by respective bus controllers, as is also known in the art.

Computer 102 will also have a random access memory unit or units 108 connected to the bus 106. RAM 108 (which may be DRAM, SDRAM or other known types) typically has loaded into it the operating system of the computer 102 and executable instructions for one or more special applications designed to carry out the invention. Computer 102 also has electronic read-only memory 110 for storing those programs such as the BIOS which are non-volatile and persist after the computer 102 is shut down.

In alternative embodiments of the invention, one or more components of the invention's logic may be "hard-wired" into the ROM 110 instead of loaded as software instructions into RAM 108. ROM 110 can consist of or comprise electrically programmable read-only memory (EPROM), electrically erasable and programmable read-only memory (EEPROM) of either flash or nonflash varieties, or other sorts of read-only memory such as programmable fuse or antifuse arrays.

In a typical architecture, a computer program suitable for carrying out the invention will be stored on a mass storage device 112, such as an optical disk or magnetic hard drive. The asset data used as a basis for portfolio selection will typically exist as a database on device 112 but could reside on a separate database server and be accessed remotely through a network. Bus 106 connects mass storage device 112 to RAM 108.

The computer 102 is connected to various peripheral devices used to communicate with an operator, such as display 114, keyboard 116, mouse 118, and printer 120. The computer 102 also uses a communications device 122 such as a modem or a network card to communicate to other computers and equipment.

As previously described, the asset allocation weights $a_{21}$–$a_{24}$ (also known as investment weighting factors $a_1$–$a4$) may be used to recommend to an investor an allocation of his or her assets among a predetermined set of investment vehicles. In FIG. 9, the computer 102 calculates asset allocation factors $a_1$–$a_4$ based on data obtained from a database 112. Some of the inputs used in calculating the investment weighting factors $a_1$–$a_4$ may be input directly by an investor from a remote computer 124 via communications link 126, which for example may be the Internet, or another hardwire or wireless connection. These data may include, for example, the subjective probability of survival $\bar{p}$ and relative risk aversion c.

The financial advisor computer 102 may further formulate investment directions concerning the allocation of assets among certain predetermined investment vehicles of the portfolio of the investor. These instructions may be conveyed over a communications link to a portfolio manager computer (not shown). The portfolio manager computer would purchase and sell shares in mutual funds according to the direction of the financial advisory computer 102. The portfolio manager may manage the portfolio of the investor individually, or may manage a retirement plan or other collective plan that includes the account of the investor. All transactions and instructions are made over secure communication paths.

The computer 102 may include a web server acting as a host for a web site, on which can be displayed a table of portfolios selectable by an investor, similar to FIG. 2A, and which is accessible, either remotely (as shown) or non-remotely (not shown) by the investor's computer 124.

EXAMPLES

To understand the predictions of the model of the present invention, let us look at four different cases so that we can see the effect of changing parameters on the optimal allocation. Each case uses the same capital market assumptions. For the sake of example assume that the return from the risk-free (T-bills) asset class is 5% per annum with no volatility. Likewise assume that the return from the risky asset is log-normally distributed with a mean value of 10% and a standard deviation of 20%. This implies a risk premium of 7%, which is in line with historical estimates. FIG. 1 is the Individual Annuity Mortality (IAM) 2000 basic table which lists the probabilities of survival for a relatively healthy population of potential annuitants. This table was compiled by the U.S.-based Society of Actuaries.

Many people might feel they are less (or more) healthy than the numbers indicated by the Individual Annuity Mortality 2000 basic table of FIG. 1; we will therefore assume that the subjective probability of survival pbar ($\bar{p}$) can be higher or lower than the objective probability of survival p.

The utility preferences for the example will be taken from within the Constant Relative Risk Aversion (CRRA) family, with a CRRA coefficient of $\gamma$. CRRA coefficient $\gamma$ typically has a value in the range of 1 to 6, although it can be as high as 10 or 20. Gamma can be obtained as a result of the answers of the investor to a questionnaire. Each of the below listed cases will assume that the individual is a 60-year-old male who would like to allocate his portfolio across the four asset classes (1) risk-free asset; 2) risky asset; 3) immediate fixed annuity; and 4) immediate variable annuity). Finally, each case will assume a 20-year horizon as representing the one-period. In other words the individual intends to liquidate the immediate annuities, consume, and re-allocate (i.e. rebalance) assets only after 20 years. It should be understood that these assumptions can be easily modified to accommodate other utility functions, asset return distributions, mortality probabilities, and horizons. Moreover, the initial wealth level does not have any impact on the allocations for the one-period model.

Case #1: Total Altruism and Complete Bequest Motives

In this case, we assume the investor's utility is derived entirely from bequest. In other words his utility of bequest is assumed to be one and his utility of consumption is zero, that is, A=0 and D=1. The objective probability of survival is 65% (roughly equal to the survival probability of a 60-year-old male in the next 20 years) and the subjective probability is the same 65%. Using these input parameters in the model described in Eqn. (1) above, the optimal allocations to the assets across various relative risk aversion levels are as presented in FIGS. 2A and 2B. More particularly, FIG. 2A is a chart showing the allocation among the four asset classes as a function of risk aversion, and FIG. 2B is a graph of the data presented in FIG. 2A.

As shown in FIGS. 2A and 2B, no assets are allocated to either the fixed immediate or the variable immediate annuities (FIA and VIA) since the investor only cares about bequest. Further, the allocation to stocks gradually decreases as the investor's risk aversion increases. Without any consumption motive, this becomes the traditional allocation problem between risk-free and risky assets. This case can be used as an illustration for extraordinarily wealthy individuals, where the size of their portfolio far exceeds their consumption needs. Therefore, bequest becomes the dominant factor. Annuities do not get any allocation, as they do not leave any money for the heirs. For example, for investors with a relative risk aversion level of 2, the optimal allocation is 36% to the risk free asset and 64% to equity.

Case #2: No Bequest Motives

This case maintains the same age (gender), survival probability and time horizon as the previous case, but simply reduces the strength of bequest from D=1 to D=0. In other words, 100% of the utility weight is placed on 'live' consumption. The optimal allocations to the assets across various risk aversion levels are presented in FIGS. 3A and 3B, in which FIG. 3A is a chart showing the allocation among the four asset classes as a function of risk-aversion, and FIG. 3B is a graph of the data presented in FIG. 3A.

As shown in FIGS. 3A and 3B, the immediate annuities get 100% of the allocation because the returns on annuities are always higher than the returns on traditional assets (p<1). The allocation to immediate variable annuity gradually decreases, while the allocation to immediate fixed annuity increases as the risk aversion of the investor increases. This case can be used as an illustration for investors who would like to maximize their lifetime consumption and have no interest in leaving any money behind. All the savings should be used to purchase annuities. Overall, the optimal allocations between risky and risk-free assets (in this case, they are immediate fixed annuity and immediate variable annuity, respectively) are almost identical to that of Case #1. For investors with a CRRA risk aversion level of 2, the optimal allocation is 36% to immediate fixed annuity and 64% to immediate variable annuity.

Case #3: 20% Bequest Motives and 80% Consumption Motives

This case maintains the same age (gender), survival probability and time horizon as the previous case, but changes the strength of bequest from D=0, to a more realistic D=0.2. In other words, 80% of the utility weight is placed on 'live' consumption. The optimal allocations to the assets across various risk aversion levels are presented in FIGS. 4A and 4B, in which FIG. 4A is a chart showing the allocation among the four asset classes as a function of risk-aversion, and FIG. 4B is a graph of the data presented in FIG. 4A.

There are several interesting results in the allocation shown in FIGS. 4A and 4B. First, unlike the previous two cases, all of the four asset classes are present in the optimal allocations. This is because immediate annuities are more suitable (relative to traditional assets) for consumption and traditional investments are more suited for bequest motives in this one-period framework. When the investor has a more balanced motive between bequest and consumption, both immediate annuities and traditional asset classes are selected. In general, the higher the bequest motives, the more the investor should allocate to traditional investments and the less to immediate annuities.

Second, the allocation between risky (both variable IA and equity) and risk-free (cash and fixed IA) is almost identical to that in Case #1 and Case #2 at comparable risk aversion levels. This indicates that the changes in the investor's bequest vs. consumption motive do not significantly impact the investor's behavior regarding risk. The optimal allocation between risky and risk-free assets is determined by the investor's risk tolerance.

Third, the allocation to annuities decreases as the investor's risk aversion increases. In other words, more risk averse investors will avoid immediate life annuities. This makes intuitive sense, since the investor could get little or no utility from immediate annuity investments if he dies shortly after the purchase. With traditional investments, there will be some left for their heirs. It seems that higher aversion to risk increases the implicit weight on the utility of bequest. For an investor with a risk aversion level of 2, the optimal allocation is 22% cash ("cash" being used herein as shorthand for an efficient investment vehicle of very low risk), 38% equity, 14% FIA, and 26% variable IA.

Case #4: Lower Subjective Survival Probability

In the fourth case, we maintain the same parameters as the third case but change the subjective survival rate ($\bar{p}$) to be smaller than the objective survival rate (p). We assume ($\bar{p}$)=0.5 and p=0.65. All other parameters are left the same. The implication is simple. The investor believes that he/she has a lower than average probability of survival. Intuitively, such an investor would allocate less to immediate annuities, since he/she is expecting a higher mortality probability than the average. See FIGS. 5A and 5B, in which FIG. 5A is a chart showing the allocation among the four asset classes as a function of risk-aversion, and FIG. 5B is a graph of the data presented in FIG. 5A.

In FIG. 5A, the total annuity allocation is significantly less than in FIG. 4A for all risk aversion levels. For investors of risk aversion level 2, the optimal allocation is 28% cash, 48% equity, 8% in fixed IA, and 16% in variable IA.

The above four cases have assumed a single male as the investor. This can be changed to single female or a married couple simply by replacing the probability of survival to parameters that are accurate for a single female or for the joint probability of survival for a couple.

In summary, a method and system for performing optimal asset allocation in the presence of fixed and variable immediate life annuities has been shown and described.

While preferred embodiments of the present invention have been described in the above detailed description, and illustrated in the drawings, the invention is not limited thereto but only by the scope and spirit of the appended claims.

What is claimed is:

1. A method for allocating assets of an investor portfolio among annuity and nonannuity assets, comprising the steps of:

retrieving at least one probability of survival of the investor;

selecting a utility of consumption and a utility of bequest of the investor;

retrieving for each of a plurality of nonannuity assets, an expected rate of return, the nonannuity assets having expected rates of return which are different from each other;

retrieving, for each of a plurality of annuity assets, an expected rate of return, the annuity assets having expected rates of return which are different from each other;

maximizing by a computer an objective utility function as the sum of a utility of a live state and a utility of a dead state given the retrieved rates of return by adjusting the values of a plurality of investment weighting factors each corresponding to a nonannuity asset or an annuity asset, said maximizing step performed in multiple iterations; and allocating assets in the portfolio to the nonannuity assets and the annuity assets according to receptive ones of the investment weighting factors.

2. The method of claim 1, wherein pairs of the annuity and nonannuity assets have the same expected rate of return.

3. The method of claim 1, wherein at least one of the annuity assets and the nonannuity assets itself comprises a portfolio of investment instruments.

4. The method of claim 1, wherein the annuity and nonannuity assets are paired in degrees of risk.

5. The method of claim 1, wherein the assets of the portfolio is allocated among two annuity assets and two nonannuity assets.

6. The method of claim 1, wherein said step of maximizing includes the further step of calculating each of the investment weighting factors for the annuity assets as a function of the probability of survival.

7. The method of claim 1, wherein said step of maximizing includes the further steps of
calculating each of the investment weighting factors as components of the utility of the live state; and
calculating each of the investment weighting factors of the nonannuity assets as components of the utility of the dead state.

8. The method of claim 1, and further comprising the steps of
retrieving a subjective probability of survival for the investor; and
performing said step of maximizing by apportioning the objective function between the utility of the live state and the utility of the dead state according to the value of the subjective probability of survival.

9. The method of claim 1, and further comprising the steps of
retrieving an objective probability of survival for the investor; and
calculating the utility of the live state as a function of the objective probability of survival of the investor.

10. The method of claim 9, wherein the investor's objective probability of survival is also chosen as a function of the investor's age, gender and ethnic origin.

11. The method of claim 1, wherein said step of maximizing the objective utility function comprises using the Method of Feasible Directions.

12. The method of claim 1, wherein said step of maximizing the objective utility function comprises using a Golden Mean grid search.

13. The method of claim 1, wherein said step of maximizing the objective utility function comprises using Simpson's Composite Rule.

14. The method of claim 1, wherein said step of maximizing the objective function comprises using a Fibonacci search algorithm.

15. The method of claim 1, wherein the investor is a joint investor and the probability of survival is a joint probability of survival.

16. The method of claim 1, wherein the investor is a sole investor and the probability of survival is a sole probability of survival.

17. The method of claim 1, wherein the weight for utility of consumption $\geq 0$, the weight for utility of bequest $\geq 0$ and the sum of the weights for utilities of consumption and bequest is one.

18. The method according to claim 1, in which the following factors are considered in maximizing the objective utility function:
(i) the investor's risk tolerance; and
(ii) the investor's age.

19. The method according to claim 1, wherein the objective utility function is maximized using a Two-Phase Simplex Method in which Phase I determines an initial feasible point of a linear program if it exists, and Phase II determines the optimal point of the linear program.

20. The method of claim 1, including a plurality of nonannuity assets, wherein the nonannuity assets have expected rates of return which are different from each other.

21. The method of claim 1, wherein said assets are all annuity assets.

22. The method of claim 1, wherein said assets are all nonannuity assets.

23. The method of claim 1, wherein said assets include both annuity and nonannuity assets.

24. A system for allocating portfolio assets of an investor among annuity and nonannuity vehicles, comprising:
a memory for storing at least one probability of survival of the investor, at least one of a utility of consumption attributed to the investor and a utility of bequest attributed to the investor, data identifying a plurality of nonannuity assets having different rates of return and degrees of risk, data identifying a plurality of annuity assets having different rates of return and degrees of risk;
a processor coupled to the memory to retrieve the stored probability of survival, the stored utility of bequest or utility of consumption and said data identifying the annuity and nonannuity assets, the processor maximizing an objective utility function as the sum of a utility of a live state and a utility of a dead state given the retrieved rates of return by adjusting the values of a plurality of investment weighting factors, each factor being a weight of a respective nonannuity or annuity asset, where the processor maximizes the objective utility function by performing multiple iterations of calculation steps; and
a portfolio asset allocator coupled to an output of the processor for allocating assets in the portfolio responsive to the adjusted values of the investment weighting factors which result in a maximum of the objective utility function.

25. The system of claim 24, wherein pairs of annuity and nonannuity assets have the same degree of risk.

26. The system of claim 24, wherein the assets to which the portfolio can be allocated are limited to first and second nonannuity assets and first and second annuity assets.

27. The system of claim 24, wherein the processor, in maximizing the utility function, calculates the annuity investment weighting factors as a function of the probability of survival.

28. The system of claim 24, wherein the processor calculates the annuity and nonannuity investment weighting factors as components of the utility of consumption, and calculates the nonannuity investment weighting factors as components of the utility of bequest.

29. The system of claim 24, wherein the memory stores a subjective probability of survival, the processor, in maximizing the objective utility function, retrieving the subjective probability of survival and apportioning the objective function between the utility of the live state and the utility of the dead state according to the value of the subjective probability of survival.

30. The system of claim 24, wherein the memory stores an objective probability of survival of the investor, the processor retrieving an objective probability of survival for the investor and calculating the utility of the live state as a function of the objective probability of survival of the investor.

31. The system of claim 24, wherein the memory stores a risk aversion factor for the investor, the processor calculating the investment weighting factors as a function of the risk aversion factor.

32. The system of claim 24, wherein the processor, in maximizing the objective utility function, uses The Method of Feasible Directions.

33. The system of claim 24, wherein the processor, in maximizing the objective utility function, uses a Golden Mean grid search.

34. The system of claim 24, wherein the processor, in maximizing the objective utility function, uses Simpson's Composite Rule.

35. A system for optimally allocating investment assets for a given user within and between annuitized assets and non-annuitized assets, comprising:
a computer having a CPU and memory;
means for providing to the computer at least one of the user's utility of consumption and utility of bequest;
means for providing to the computer the user's objective probability of survival based on the user's age;
means for providing to the computer the user's subjective probability of survival based on the user's physical well-being;
means for providing to the computer an expected rate of return from each of a plurality of assets, ones of the assets being riskier than others of the assets; and
means for maximizing an objective utility function which is calculated as a function of the asset expected rates of return, a utility of a live state of the user and a utility of a dead state of the user and a plurality of asset allocation weights respectively corresponding to the different assets, where the means for maximizing maximizes the objective utility function by performing multiple iterations of calculation steps.

36. The system of claim 35 wherein the objective utility function is maximized using the Method of Feasible Directions.

37. The system of claim 35 wherein the objective utility function is maximized using a Golden Mean grid search.

38. The system of claim 35, wherein the objective utility function is maximized using Simpson's Composite Rule.

39. The system of claim 35, wherein the following decision factors are taken into consideration in maximizing the objective utility function:
(i) the investor's risk tolerance; and
(ii) the investor's age.

40. The system according to claim 35 wherein the objective utility function is maximized using a Two-Phase Simplex Method in which Phase I determines an initial feasible point of a linear program if it exists, and Phase II determines the optimal point of the linear program.

41. A machine-readable medium on which has been prerecorded a computer program which, when executed by a processor, performs the following steps:
retrieving at least one probability of survival of an investor;
selecting a utility of consumption and a utility of bequest of the investor;
retrieving, for each of a plurality of annuity assets and nonannuity assets, an expected rate of return, each nonannuity asset and each annuity asset having an expected rate of return and a degree of risk which is different from others of the assets;
maximizing an objective utility function as the sum of a utility of a live state and a utility of a dead state given the retrieved rates of return by adjusting the values of a plurality of investment weighting factors corresponding to respective ones of the annuity and nonannuity assets, where the processor performs said step of maximizing in multiple iterations; and
allocating assets in a portfolio of the investor comprising the nonannuity assets and the annuity assets according to the investment weighting factors for which the objective utility function is maximized.

42. The medium of claim 41, wherein pairs of annuity and nonannuity assets have the same expected rate of return.

43. The medium of claim 41, wherein at least one of the assets itself comprises a portfolio of investment instruments.

44. The medium of claim 41, wherein pairs of annuity and nonannuity assets have the same degree of risk.

45. The medium of claim 41, wherein the investment weighting factors corresponding to the annuity assets are calculated as a function of the probability of survival.

46. The medium of claim 41, wherein said step of maximizing includes the further steps of
calculating the investment weighting factors of the annuity assets and the nonannuity assets as components of the utility of the live state; and
calculating the investment weighting factors of the nonannuity assets as components of the utility of the dead state.

47. The medium of claim 41, wherein the processor performs the further steps of
retrieving a subjective probability of survival for the investor; and
performing said step of maximizing by apportioning the objective utility function between the utility of the live state and the utility of the dead state according to the value of the subjective probability of survival.

48. The medium of claim 41, wherein the processor performs the further steps of
retrieving an objective probability of survival for the investor; and
calculating the utility of the live state as a function of the objective probability of survival of the investor.

49. The medium of claim 41 wherein the processor maximizes the objective utility function by using the Method of Feasible Directions.

50. The medium of claim 41, wherein the processor maximizes the objective utility function by using a Golden Mean grid search.

51. The medium of claim 41, wherein the processor maximizes the objective utility function by using Simpson's Composite Rule.

52. The medium of claim 41, wherein the processor maximizes the objective utility function by using a Fibonacci search algorithm.

53. The medium of claim 41, wherein the investor is a joint investor and the retrieved probability of survival is a joint probability of survival.

54. The medium of claim 41, wherein the investor is a sole investor and the retrieved probability of survival is a sole probability of survival.

55. The medium of claim 41 wherein the objective utility function is a function of the investor's risk tolerance and the investor's age.

56. The medium of claim 41 wherein the objective function is maximized using the Two-Phase Simplex Method, a first phase of the two-phase simplex method determining an initial feasible point of a linear program if it exists, the second phase of the two-phase simplex method determining the optimal point of the linear program.

57. A method for allocating assets of an investor to a plurality of annuity and nonannuity investment vehicles, comprising the steps of:
retrieving personal characteristics of the investor, the characteristics including age, a risk aversion measure and at least one of a utility of consumption and a utility of bequest;
retrieving data about the financial assets of the investor, including, for each investment vehicle presently employed by the investor, a measure of risk of the investment vehicle, a rate of expected return for the investment vehicle, and an amount of assets in the investment vehicle, the sum of the assets in the investment vehicles being the total financial assets of the investor;
classifying the investment vehicles of the investor into allocatable investment vehicles whose assets may be reallocated, and nonallocatable investment vehicles whose assets may not be reallocated;
providing a plurality of asset classes having varying degrees of risk and expected return, the asset classes including nonannuity asset classes and annuity asset classes;
attributing the present investment vehicles of the investor to the asset classes as a function of the risk and expected return of the asset class and the investment vehicle;
maximizing an objective utility function as the sum of a utility of a live state and a utility of a dead state given the rates of expected return of the asset classes by adjusting values of a plurality of investment weighting factors each corresponding to an asset class, where said step of maximizing is performed in multiple iterations; and
rebalancing the total financial assets of the investor among the asset classes as a function of the investment weighting factors by adjusting the amount of assets held in each of the allocatable investment vehicles.

58. The method of claim 57, wherein pairs of the annuity and nonannuity asset classes have the same expected rate of return.

59. The method of claim 57, wherein at least one of the annuity asset classes and the nonannuity asset classes itself comprises a portfolio of investment instruments.

60. The method of claim 57, wherein the annuity and nonannuity asset classes are paired in degrees of risk.

61. The method of claim 57, wherein said step of maximizing includes the further step of calculating each of the investment weighting factors for the annuity assets as a function of the probability of survival.

62. The method of claim 57, wherein said step of maximizing includes the further steps of
calculating each of the investment weighting factors as components of the utility of the live state; and
calculating each of the investment weighting factors of the nonannuity assets as components of the utility of the dead state.

63. The method of claim 57, and further comprising the steps of
retrieving a subjective probability of survival for the investor; and
performing said step of maximizing by apportioning the objective function between the utility of the live state and the utility of the dead state according to the value of the subjective probability of survival.

64. The method of claim 57, and further comprising the steps of
retrieving an objective probability of survival for the investor; and
calculating the utility of the live state as a function of the objective probability of survival of the investor.

65. The method of claim 64, wherein the user's objective probability of survival is also chosen as a function of the user's gender and ethnic origin.

66. The method of claim 57, wherein said step of maximizing the objective utility function comprises using the Method of Feasible Directions.

67. The method of claim 57, wherein said step of maximizing the objective utility function comprises using a Golden Mean grid search.

68. The method of claim 57, wherein said step of maximizing the objective utility function comprises using Simpson's Composite Rule.

69. The method of claim 57, wherein said step of maximizing the objective function comprises using a Fibonacci search algorithm.

70. The method of claim 57, wherein the investor is a joint investor and the probability of survival is a joint probability of survival.

71. The method of claim 57, wherein the investor is a sole investor and the probability of survival is a sole probability of survival.

72. The method of claim 57, wherein the utility of consumption $\geq 0$, the utility of bequest $\geq 0$ and the sum of the utilities of consumption and bequest is one.

73. The method according to claim 57, in which the following factors are considered in maximizing the objective utility function:
(i) the investor's risk tolerance; and
(ii) the investor's age.

74. The method according to claim 57, wherein the objective utility function is maximized using a Two-Phase Simplex Method in which Phase I determines an initial feasible point of a linear program if it exists, and Phase II determines the optimal point of the linear program.

75. A method of comparing a current allocation of assets in an investment portfolio by a portfolio manager with an optimum allocation of the assets of the portfolio among a plurality of annuity and nonannuity assets, comprising the steps of:
retrieving, for the investor for which the portfolio has been established, at least one probability of survival;
retrieving for the investor a utility of consumption and a utility of bequest;
retrieving, for each of the annuity and nonannuity assets, an expected rate of return, ones of the annuity assets having rates of return which are different from others of the annuity assets, ones of the nonannuity assets having rates of return which are different from others of the nonannuity assets;
relating a utility of a live state of the investor to a utility of a dead state of the investor as a function of the utility of consumption and the utility of bequest;
maximizing an objective utility function as the sum of the utility of the live state and the utility of the dead state given the retrieved rates of return by adjusting the values of a plurality of investment weighting factors each corresponding to one of the annuity assets or one of the nonannuity assets, where said step of maximizing is performed in multiple iterations;

making a proposed allocation of the assets of the portfolio among the nonannuity assets and the annuity assets according to the relative values of the investment weighting factors;

comparing the proposed allocation to the current allocation; and modifying the current allocation in view of the proposed allocation.

76. The method of claim 75, wherein pairs of the annuity and nonannuity assets have the same expected rate of return.

77. The method of claim 75, wherein at least one of the annuity assets and the nonannuity assets itself comprises a portfolio of investment instruments.

78. The method of claim 75, wherein the annuity and nonannuity assets are paired in degrees of risk.

79. The method of claim 75, wherein the assets of the portfolio is allocated among two annuity assets and two nonannuity assets.

80. The method of claim 75, wherein said step of maximizing includes the further step of calculating each of the investment weighting factors for the annuity assets as a function of the probability of survival.

81. The method of claim 75, wherein said step of maximizing includes the further steps of calculating each of the investment weighting factors as components of the utility of the live state; and calculating each of the investment weighting factors of the nonannuity assets as components of the utility of the dead state.

82. The method of claim 75, and further comprising the steps of retrieving a subjective probability of survival for the investor; and performing said step of maximizing by apportioning the objective function between the utility of the live state and the utility of the dead state according to the value of the subjective probability of survival.

83. The method of claim 75, and further comprising the steps of retrieving an objective probability of survival for the investor; and calculating the utility of the live state as a function of the objective probability of survival of the investor.

84. The method of claim 83, wherein the user's objective probability of survival is also chosen as a function of the user's gender and ethnic origin.

85. The method of claim 75, wherein said step of maximizing the objective utility function comprises using the Method of Feasible Directions.

86. The method of claim 75, wherein said step of maximizing the objective utility function comprises using a Golden Mean grid search.

87. The method of claim 75, wherein said step of maximizing the objective utility function comprises using Simpson's Composite Rule.

88. The method of claim 75, wherein said step of maximizing the objective function comprises using a Fibonacci search algorithm.

89. The method of claim 75, wherein the investor is a joint investor and the probability of survival is a joint probability of survival.

90. The method of claim 75, wherein the investor is a sole investor and the probability of survival is a sole probability of survival.

91. The method of claim 75, wherein the utility of consumption $\geq 0$, the utility of bequest $\geq 0$ and the sum of the utilities of consumption and bequest is one.

92. The method according to claim 75, in which the following factors are considered in maximizing the objective utility function:

(i) the investor's risk tolerance; and (ii) the investor's age.

93. The method according to claim 75, wherein the objective utility function is maximized using a Two-Phase Simplex Method in which Phase I determines an initial feasible point of a linear program if it exists, and Phase II determines the optimal point of the linear program.

94. A method for allocating assets of an investor portfolio among annuity and nonannuity assets, comprising the steps of:

retrieving at least one probability of survival of the investor;

selecting a utility of consumption and a utility of bequest of the investor;

retrieving for at least one nonannuity asset or at least one annuity asset or both, an expected rate of return;

maximizing an objective utility function as the sum of a utility of a live state and a utility of a dead state given the retrieved rate(s) of return by adjusting the values of a plurality of investment weighting factors each corresponding to an asset, where the step of maximizing is performed in multiple iterations; and allocating assets in the portfolio to the asset(s) according to receptive ones of the investment weighting factors.

95. The method of claim 94, including a plurality of annuity assets, wherein the annuity assets have expected rates of return which are different from each other.

* * * * *